(12) United States Patent
Morita et al.

(10) Patent No.: US 10,065,255 B2
(45) Date of Patent: Sep. 4, 2018

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC CORPORATION, Yamanashi (JP)

(72) Inventors: Yuuki Morita, Yamanashi (JP); Tadashi Okita, Yamanashi (JP); Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/217,058

(22) Filed: Jul. 22, 2016

(65) Prior Publication Data

US 2017/0028490 A1    Feb. 2, 2017

(30) Foreign Application Priority Data

Jul. 29, 2015   (JP) .................................. 2015-149535

(51) Int. Cl.
   *B23G 1/32*       (2006.01)
   *G05B 19/416*    (2006.01)
   (Continued)

(52) U.S. Cl.
   CPC ................. *B23G 1/32* (2013.01); *B23G 1/16* (2013.01); *G05B 19/416* (2013.01);
   (Continued)

(58) Field of Classification Search
   CPC ........ B23G 1/16; B23G 1/32; G05B 19/4141; G05B 19/416; G05B 2219/49108; G05B 2219/50232
   See application file for complete search history.

(56) References Cited

U.S. PATENT DOCUMENTS

| | | | | |
|---|---|---|---|---|
| 4,879,660 A | * | 11/1989 | Asakura | G05B 19/186 318/39 |
| 5,184,053 A | * | 2/1993 | Maruo | G05B 19/186 318/39 |

(Continued)

FOREIGN PATENT DOCUMENTS

| | | |
|---|---|---|
| CN | 101863424 A | 10/2010 |
| CN | 103092131 A | 5/2013 |

(Continued)

*Primary Examiner* — Abdelmoniem Elamin
(74) *Attorney, Agent, or Firm* — Hauptman Ham, LLP

(57) ABSTRACT

A controller for controlling a synchronized operation of spindle and feed axes. A spindle-axis control section includes an initial-motion control section for making a spindle axis perform an accelerated rotation at maximum capacity from a process start position; a maximum-acceleration detecting section for detecting a maximum acceleration of the spindle axis; a residual rotation-amount detecting section for detecting a residual rotation amount of the spindle axis; a current-speed detecting section for detecting a current speed of the spindle axis; a positioning-motion control section for making the spindle axis perform a decelerated rotation so as to reach the target thread depth after the accelerated rotation; and an overshoot detecting section for detecting an overshoot of the spindle axis during the decelerated rotation.

10 Claims, 10 Drawing Sheets

(51) Int. Cl.
*B23G 1/16* (2006.01)
*G05B 19/414* (2006.01)

(52) U.S. Cl.
CPC ............... *G05B 19/4141* (2013.01); *G05B 2219/49108* (2013.01); *G05B 2219/50232* (2013.01)

(56) References Cited

U.S. PATENT DOCUMENTS

| | | | |
|---|---|---|---|
| 6,008,609 A | | 12/1999 | Sawashima et al. |
| 2013/0300337 A1* | | 11/2013 | Nagaoka .............. G05B 19/416 318/671 |
| 2015/0081084 A1* | | 3/2015 | Nishiwaki ................ B23G 1/16 700/170 |
| 2016/0291580 A1* | | 10/2016 | Morita ................. G05B 19/416 |
| 2016/0357171 A1* | | 12/2016 | Morita ............... G05B 19/4141 |
| 2017/0212502 A1* | | 7/2017 | Morita ................. G05B 19/414 |

FOREIGN PATENT DOCUMENTS

| | | |
|---|---|---|
| DE | 19905775 C2 | 1/2001 |
| JP | 2629729 B2 | 7/1997 |
| JP | 2003-181722 A | 7/2003 |
| JP | 3553741 B2 | 8/2004 |
| JP | 2006-315094 A | 11/2006 |
| JP | 4014485 B2 | 11/2007 |
| WO | 2014/162745 A1 | 10/2014 |

\* cited by examiner

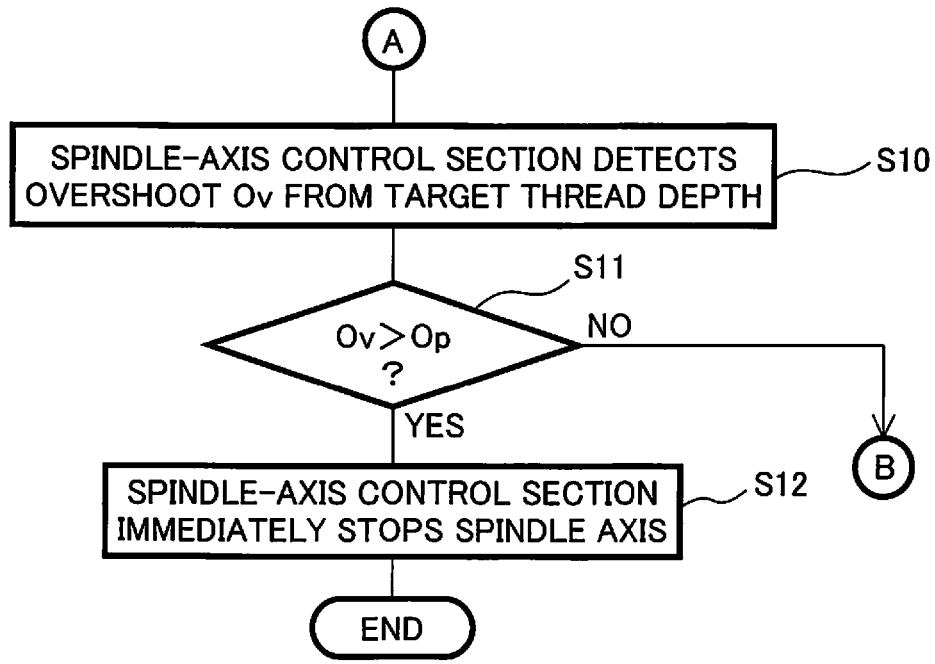
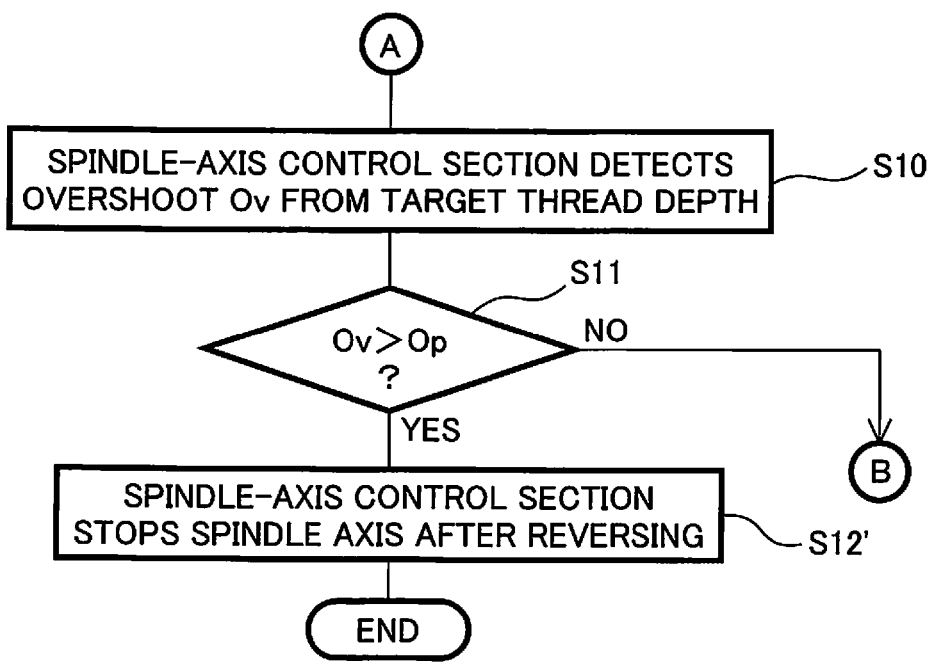

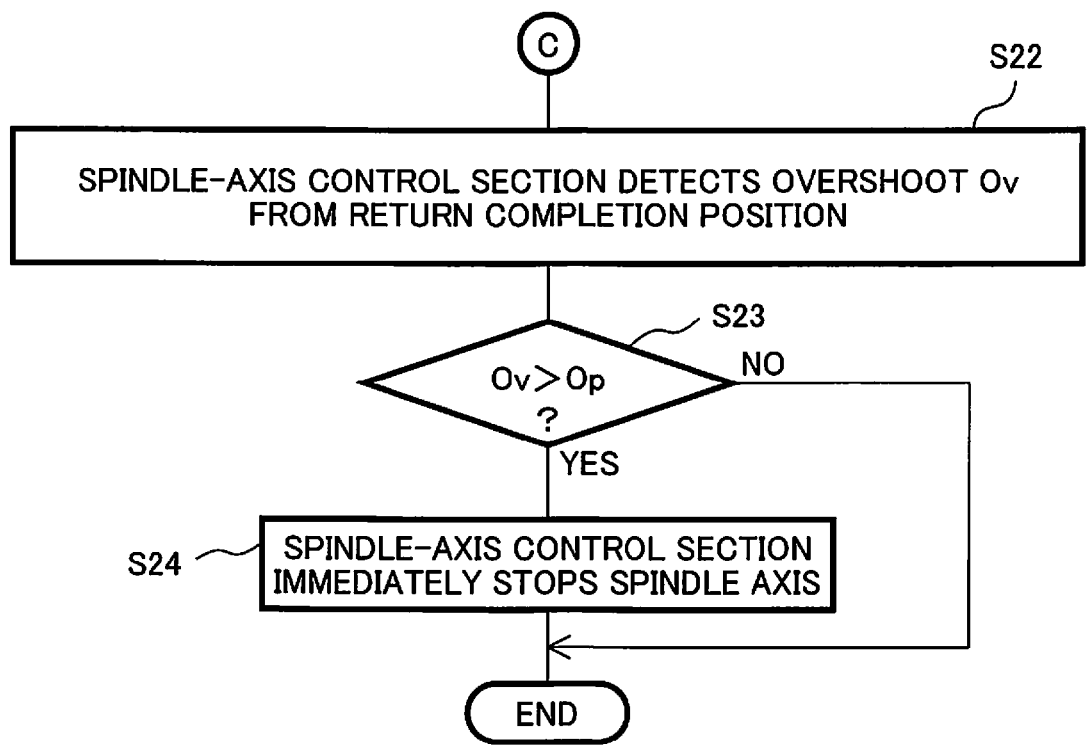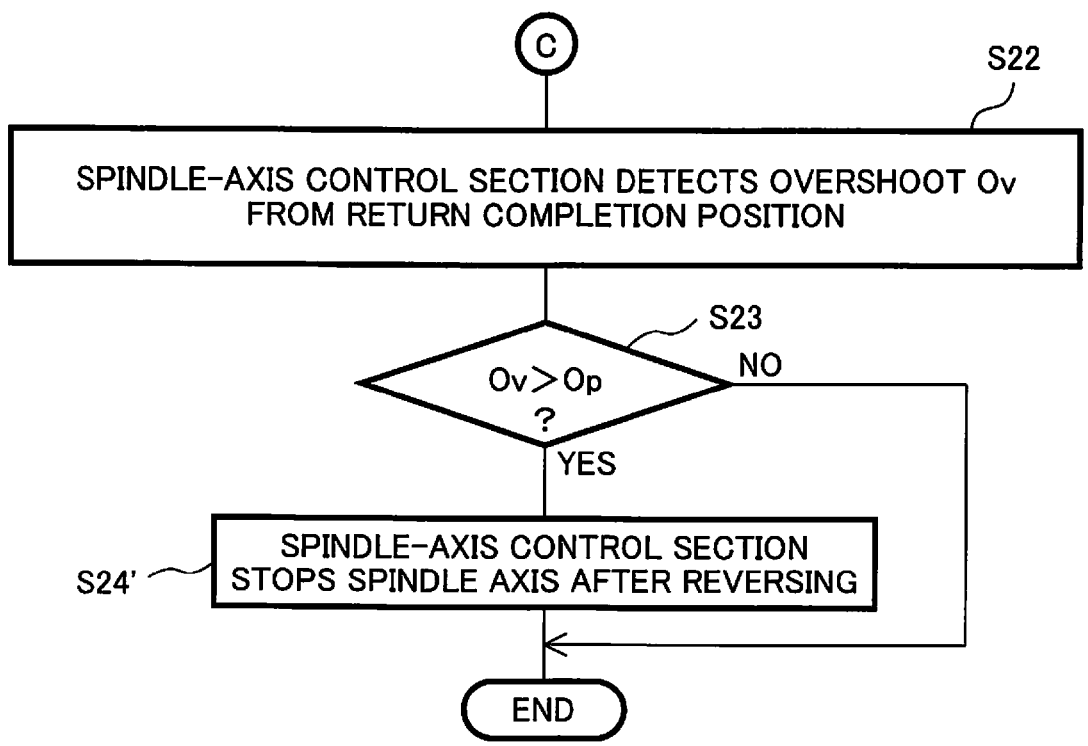

DEVICE AND METHOD OF CONTROLLING MACHINE TOOL, TO CONTROL SYNCHRONIZED OPERATION OF SPINDLE AXIS AND FEED AXIS

RELATED APPLICATIONS

The present application claims priority to Japanese Application Number 2015-149535, filed Jul. 29, 2015, the disclosure of which is hereby incorporated by reference herein in its entirety.

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle (or principal) axis and a feed axis, various kinds of configurations for improving processing accuracy and reducing cycle time have been proposed. For example, Japanese Patent No. 2629729 (JP2629729B) discloses a thread forming apparatus that performs a tapping process by operating a feed axis to follow the rotation of a spindle axis, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy. On the other hand, Japanese Patent No. 3553741 (JP3553741B) discloses a method of acceleration and deceleration control of a spindle motor, executed by a numerical control unit that performs synchronization control of a spindle axis and a feed axis for a tapping process, in which the numerical control unit prepares an acceleration and deceleration command in conformity with the power characteristics of the spindle axis, and controls the spindle axis based on the acceleration and deceleration command to improve the response of the spindle axis, so as to reduce cycle time.

SUMMARY OF THE INVENTION

In a machine tool capable of performing a tapping process by a synchronized operation of a spindle axis and a feed axis, cycle time is generally determined depending on the acceleration capacity of the spindle axis. It is desirable to reduce cycle time by controlling the spindle axis so as to maximize the acceleration capacity thereof with a simple configuration, without performing a preliminary work requiring a high-level skill, such as a parameter setting or adjustment, etc., required for a numerical control unit to prepare acceleration and deceleration commands in conformity with the power characteristics of the spindle axis.

One aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position of the spindle axis. The numerical control section comprises a spindle-axis command outputting section configured to obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section. The spindle-axis control section comprises an initial-motion control section configured to make the spindle axis perform an accelerated rotation at maximum capacity from the process start position, by a velocity control in which the maximum rotation speed is set as a target value; a maximum-acceleration detecting section configured to detect a maximum acceleration of the spindle axis during the accelerated rotation at maximum capacity, based on the rotational position of the spindle axis; a residual rotation-amount detecting section configured to detect a residual rotation amount of the spindle axis during a period when the spindle axis operates from a current position to the target thread depth, based on the total rotation amount and the rotational position of the spindle axis; a current-speed detecting section configured to detect a current speed of the spindle axis based on the rotational position of the spindle axis; a positioning-motion control section configured to execute a position control for making the spindle axis perform a decelerated rotation so as to reach the target thread depth, after the accelerated rotation at maximum capacity, based on the maximum acceleration, the residual rotation amount and the current speed; and an overshoot detecting section configured to detect an overshoot of the spindle axis relative to the target thread depth during the decelerated rotation, based on the residual rotation amount.

Another aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position. The numerical control section comprises a spindle-axis command outputting section configured to obtain, from the tapping program, a total return-rotation amount and a maximum return-rotation speed of the spindle axis during a period when the spindle axis operates from a target thread depth to a return completion position, and to send the total return-rotation amount and the maximum return-rotation speed as the spindle-axis command to the spindle-axis control section. The spindle-axis control section comprises an initial-motion control section configured to make the spindle axis perform an accelerated inverse rotation at maximum capacity from the target thread depth or from an initial return position at which the spindle axis has returned by a predetermined rotation number from the target thread depth, by a velocity control in which the maximum return-rotation speed is set as a target value; a maximum-acceleration detecting section configured to detect or obtain a maximum acceleration of inverse rotation of the spindle axis during a period when the spindle axis performs the accelerated inverse rotation from the target thread depth; a residual rotation-amount detecting section configured to detect a residual return-rotation amount of the spindle axis during a period when the spindle axis operates from a current position to the return completion position, based on the total return-rotation amount and the rotational position; a current-speed detecting section configured to detect a current speed of inverse rotation of the spindle axis based on the rotational position; a positioning-motion control section configured to execute a position control for making the spindle axis perform a decelerated inverse rotation and stop at the return completion position, after the accelerated inverse rotation at maximum capacity, based on the maximum acceleration of inverse rotation, the residual return-rotation amount and the current speed of inverse rotation; and an overshoot detecting section configured to detect an overshoot of the spindle axis relative to the return completion position during the decelerated inverse rotation, based on the residual return-rotation amount.

A further aspect of the invention provides a method of controlling a machine tool, configured to control a synchronized operation of a spindle axis and a feed axis, the method comprising the steps, executed by a controller, of obtaining, from a tapping program, a total rotation amount and a maximum rotation speed of the spindle axis during a period when the spindle axis operates from a process start position to a target thread depth; making the spindle axis perform an accelerated rotation at maximum capacity from the process start position, by a velocity control in which the maximum rotation speed is set as a target value; detecting a maximum acceleration of the spindle axis during the accelerated rotation at maximum capacity, based on a rotational position feedback of the spindle axis; detecting a residual rotation amount of the spindle axis during a period when the spindle axis operates from a current position to the target thread depth, based on the total rotation amount and the rotational position feedback; detecting a current speed of the spindle axis based on the rotational position feedback; executing a position control for making the spindle axis perform a decelerated rotation so as to reach the target thread depth, after the accelerated rotation at maximum capacity, based on the maximum acceleration, the residual rotation amount and the current speed; and detecting an overshoot of the spindle axis relative to the target thread depth during the decelerated rotation, based on the residual rotation amount.

An yet further aspect of the invention provides a method of controlling a machine tool, configured to control a synchronized operation of a spindle axis and a feed axis, the method comprising the steps, executed by a controller, of obtaining, from a tapping program, a total return-rotation amount and a maximum return-rotation speed of the spindle axis during a period when the spindle axis operates from a target thread depth to a return completion position; making the spindle axis perform an accelerated inverse rotation at maximum capacity from the target thread depth or from an initial return position at which the spindle axis has returned by a predetermined rotation number from the target thread depth, by a velocity control in which the maximum return-rotation speed is set as a target value; detecting or obtaining a maximum acceleration of inverse rotation of the spindle axis during a period when the spindle axis performs the accelerated inverse rotation from the target thread depth; detecting a residual return-rotation amount of the spindle axis during a period when the spindle axis operates from a current position to the return completion position, based on the total return-rotation amount and a rotational position feedback of the spindle axis; detecting a current speed of inverse rotation of the spindle axis based on the rotational position feedback; executing a position control for making the spindle axis perform a decelerated inverse rotation and stop at the return completion position, after the accelerated inverse rotation at maximum capacity, based on the maximum acceleration of inverse rotation, the residual return-rotation amount and the current speed of inverse rotation; and detecting an overshoot of the spindle axis relative to the return completion position during the decelerated inverse rotation, based on the residual return-rotation amount.

The controller according to one aspect has a configuration wherein, when the spindle axis is made to perform a cutting motion from the process start position to the target thread depth, the numerical control section instructs only the total rotation amount and the maximum rotation speed, of the spindle axis, as the spindle axis command to the spindle-axis control section, and the spindle-axis control section performs, in accordance with the spindle axis command, the cutting motion by accelerating the spindle axis with a maximum power using a maximum permissible current, aiming at the maximum rotation speed, and continuously performs, based on the maximum acceleration during the accelerating step and the residual rotation amount and current speed of the spindle axis, the cutting motion until the target thread depth in the shortest time while decelerating the spindle axis at the maximum deceleration so as to make the spindle axis reach the target thread depth. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration wherein, when the spindle axis reaches the target thread depth, the overshoot detecting section of the spindle-axis control section detects the overshoot of the spindle axis relative to the target thread depth based on the residual rotation amount. Accordingly, it is possible to quickly judge whether the overshoot of the spindle axis relative to the target thread depth is abnormal or not, and to promptly perform urgent countermeasures, such as a forced outage of the spindle axis, when the abnormal overshoot occurs, so that it is possible to ensure a dimensional accuracy required for the tapping process.

The controller according to the other aspect has a configuration wherein, when the spindle axis is made to perform a return motion from the target thread depth to the return completion position, the numerical control section instructs only the total return-rotation amount and the maximum return-rotation speed, of the spindle axis, as the spindle axis command to the spindle-axis control section, and the spindle-axis control section performs, in accordance with the spindle axis command, the return motion by accelerating the spindle axis with a maximum power using a maximum permissible current, aiming at the maximum return-rotation speed, and continuously performs, based on the maximum acceleration during the accelerating step and the residual return-rotation amount and current speed of the spindle axis, the return motion until the return completion position in the shortest time while decelerating the spindle axis at the maximum deceleration so as to make the spindle axis stop at the return completion position. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration wherein, when the spindle axis reaches the return completion position, the overshoot detecting section of the spindle-axis control section detects the overshoot of the spindle axis relative to the return completion position based on the residual return-rotation amount. Accordingly, it is possible to quickly judge whether the overshoot of the spindle axis relative to the return completion position is abnormal or not, and to promptly perform urgent countermeasures, such as a forced outage of the spindle axis, when the abnormal overshoot occurs, so that it is possible, e.g., to prevent an interference from being unexpectedly caused between a mechanical component performing an inverse feed motion by the feed axis and a nearby object.

In the control method according to the further aspect, effects corresponding to those achieved by the above-described controller can be obtained.

BRIEF DESCRIPTION OF THE DRAWINGS

The objects, features and advantages of the present invention will become more apparent from the following description of the embodiments in connection with the accompanying drawings, wherein:

FIG. 5A is a flowchart showing one example of an overshoot monitoring flow subsequent to the cutting motion control flow of FIG. 2;

FIG. 5B is a flowchart showing another example of an overshoot monitoring flow subsequent to the cutting motion control flow of FIG. 2;

FIG. 7A is a flowchart showing one example of an overshoot monitoring flow subsequent to the return motion control flow of FIG. 6;

FIG. 7B is a flowchart showing another example of an overshoot monitoring flow subsequent to the return motion control flow of FIG. 6;

DETAILED DESCRIPTION

Figure 1:
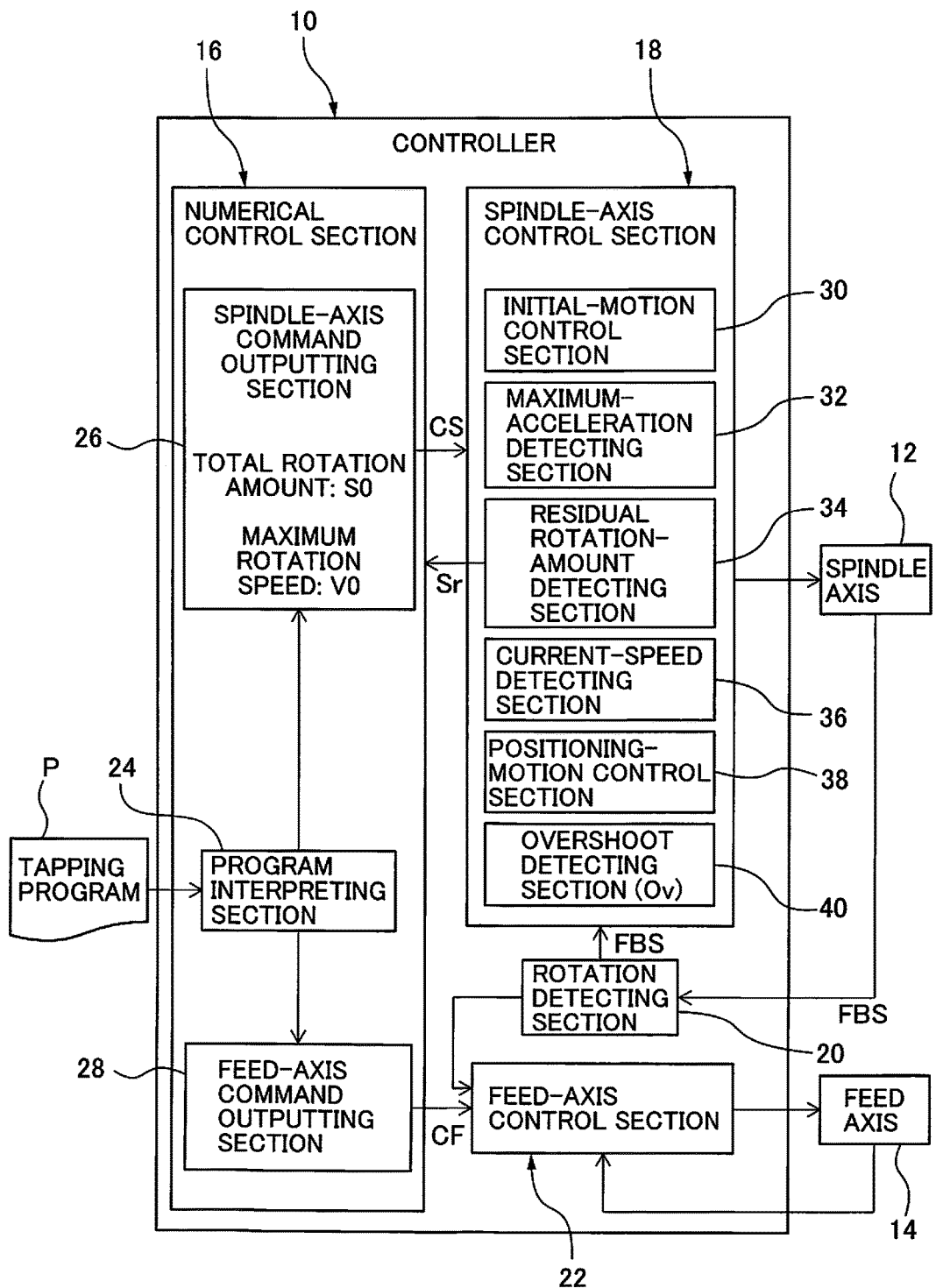
FIG. 1 is a functional block diagram showing a configuration of one embodiment of a machine tool controller.

Embodiments of the present invention will be described below with reference to the accompanying drawings. Throughout the drawings, corresponding components are denoted by common reference numerals.

FIG. 1 is a functional block diagram showing a configuration of a device 10 of controlling (i.e., a controller 10 of) a machine tool, according to one embodiment. The controller 10 has a configuration for controlling a synchronized operation (so called a master-slave synchronization) of a spindle axis 12 and a feed axis 14, in a machine tool (e.g., a lathe, a drilling machine, a machining center, etc.) capable of performing a tapping process by the synchronized operation, in which the feed axis 14 operates to follow the rotational motion of the spindle axis 12 by taking into account a thread pitch designated by a tapping program P. Though not illustrated, the spindle axis 12 is a control axis provided for a drive unit, such as a spindle motor, that rotates a hold unit for holding a workpiece or a tool at a necessary speed for processing. Though not illustrated, the feed axis 14 is a control axis provided for a drive unit, such as a servo motor, that feeds a support unit for supporting a workpiece or a tool at a necessary speed for processing. For example, in a lathe, the tool may be linearly fed by the feed axis 14 relative to the workpiece rotated by the spindle axis 12, or alternatively, the workpiece rotated by the spindle axis 12 may be linearly fed by the feed axis 14 relative to the tool. On the other hand, in a drilling machine, the tool rotated by the spindle axis 12 may be linearly fed by the feed axis 14 relative to the workpiece, or alternatively, the workpiece may be linearly fed by the feed axis 14 relative to the tool rotated by the spindle axis 12. In any of the cases, the feed axis 14 that has a relatively wide margin of acceleration/deceleration torque during operation operates to follow the spindle axis 12 that has a relatively less margin of acceleration/deceleration torque during operation, whereby it is possible to reduce a synchronization error and improve a processing accuracy. It should be noted that in the present invention the configuration of the machine tool is not particularly limited.

The controller 10 includes a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare the spindle-axis command CS in accordance with the interpretation of the program interpreting section 24 and send the spindle-axis command CS to the spindle-axis control section 18; and a feed-axis command outputting section 28 configured to prepare the feed-axis command CF in accordance with the interpretation of the program interpreting section 24 and send the feed-axis command CF to the feed-axis control section 22. The numerical control section 16 may include a hardware configuration of a conventional CNC unit.

Before starting a tapping process, the spindle-axis command outputting section 26 obtains, from a command value provided in the tapping program P interpreted by the program interpreting section 24, a total rotation amount S0 and a maximum rotation speed V0, of the spindle axis 12, during a period when the spindle axis operates from a process start position (a rotational position) to a target thread depth (a rotational position), and sends the total rotation amount S0 and the maximum rotation speed V0 as the spindle-axis command CS to the spindle-axis control section 18. For example, in the case where the tapping program P includes instructions for processing an internal thread having a thread pitch of 1.25 mm and a thread depth of 30 mm with the maximum rotation speed (maximum revolutions per minute, in this example) V0 of the spindle axis 12 set at 3000 rev/min, the total rotation amount S0 of the spindle axis 12, from the process start position to the target thread depth, is calculated as 30÷1.25=24 (rev). Accordingly, the spindle-axis command outputting section 26 notifies the spindle-axis control section 18 of V0=3000 (rev/min) and S0=24 (rev). In this way, the spindle-axis command CS does not include a position command and/or an acceleration/deceleration command, which makes the spindle axis 12 perform a rotational motion until the target thread depth.

The spindle-axis control section 18 controls the rotational motion of the spindle axis 12 by a conventional feedback control, with use of a rotational position FBS (i.e., a feedback value) of the spindle axis 12 detected by the rotation detecting section 20. The feed-axis control section 22 controls the feed motion of the feed axis 14, which follows the motion of the spindle axis 12, by a feedback control, with use of the rotational position FBS of the spindle axis 12 in addition to the feedback value of the feed position of the feed axis 14. The rotation detecting section 20 can obtain the rotational position FBS from the output of a position detector (not shown), such as an encoder, etc., for detecting the operating position of the drive unit of the spindle axis 12.

The spindle-axis control section 18 includes an initial-motion control section 30 configured to make the spindle axis 12 perform an accelerated rotation at maximum capacity from the process start position, by a velocity control in which the maximum rotation speed V0, sent from the spindle-axis command outputting section 26, is set as a target value; a maximum-acceleration detecting section 32 configured to detect a maximum acceleration A0 (unit may be represented as, e.g., rev/min$^2$) of the spindle axis 12 during the accelerated rotation at maximum capacity, based on the rotational position FBS; a residual rotation-amount detecting section 34 configured to detect a residual rotation amount Sr of the spindle axis 12 during a period when the spindle axis operates from a current position (a rotational position) to the target thread depth, based on the total rotation amount S0, sent from the spindle-axis command outputting section 26, and the rotational position FBS; a current-speed detecting section 36 configured to detect a current speed Vc of the spindle axis 12 based on the rotational position FBS; a positioning-motion control section 38 configured to execute a position control for making the spindle axis 12 perform a decelerated rotation so as to reach the target thread depth, after the accelerated rotation at maximum capacity, based on the maximum acceleration A0, the residual rotation amount Sr and the current speed Vc; and an overshoot detecting section 40 configured to detect an overshoot (a rotation amount) Ov of the spindle axis 12 relative to the target thread depth during the decelerated rotation, based on the residual rotation amount Sr. The positioning-motion control section 38 may be configured to make the spindle axis 12 stop at the target thread depth. Alternatively, the positioning-motion motion control section 38 may be configured not to make the spindle axis 12 stop at the target thread depth.

The controller 10 is capable of controlling, in a tapping process using a machine tool, a motion of the spindle axis 12 for cutting a pilot hole of a workpiece with a tool until a target thread depth (referred to as a cutting motion, in this application). Also, the controller 10 is capable of controlling, in a tapping process using a machine tool, a motion of the spindle axis 12 for pulling out a tool from a workpiece after cutting a pilot hole of the workpiece until a target thread depth (referred to as a return motion, in this application).

Figure 2:
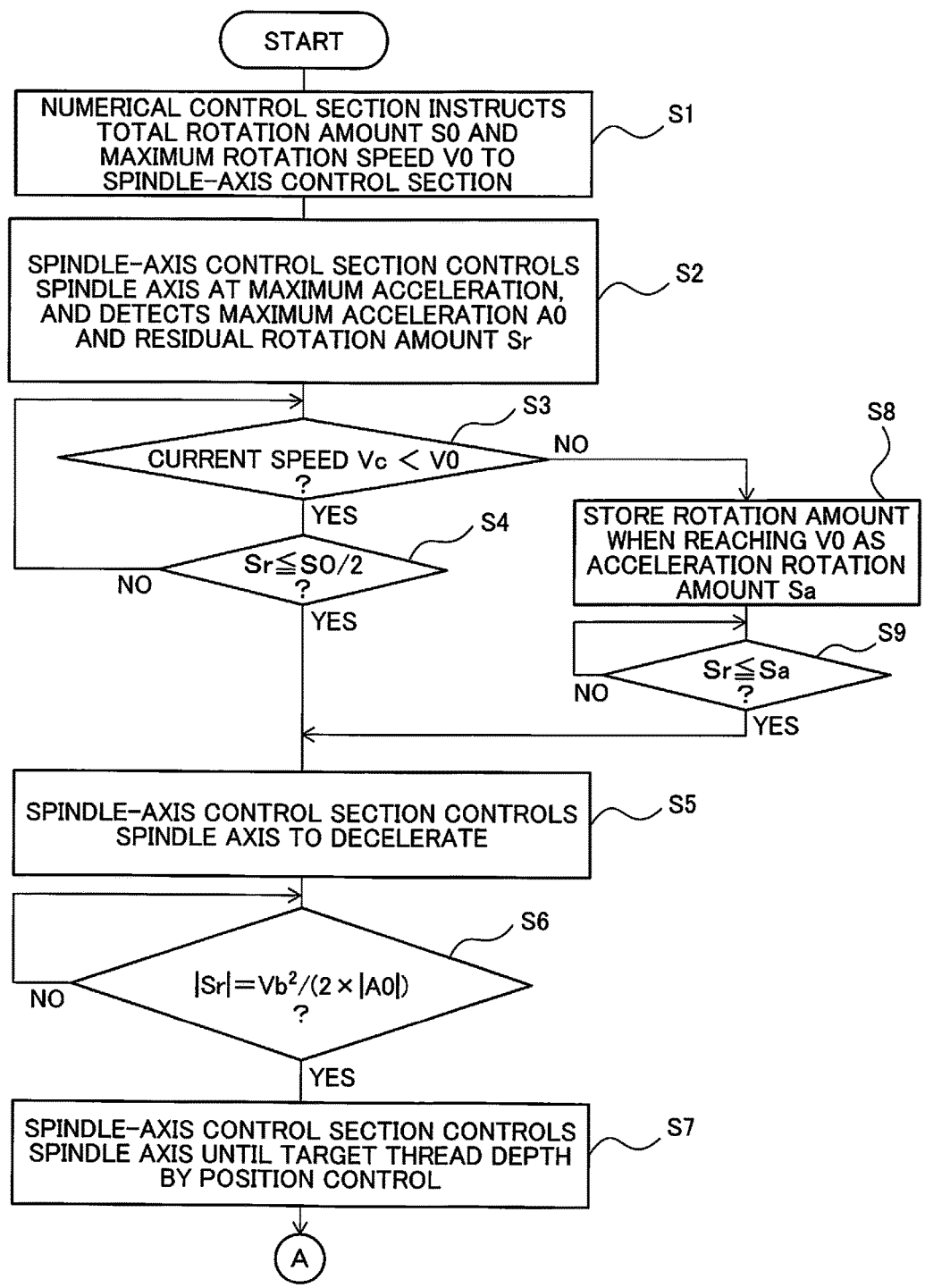
FIG. 2 is a flowchart showing a cutting motion control method for a tapping process, which is one embodiment of a machine tool control method.

FIG. 2 shows a cutting motion control method adapted to be performed for the spindle axis 12 in a tapping process, as one embodiment of a method of controlling a machine tool executed by the controller 10. The configuration of the controller 10 will be described below in detail, with reference to one example of a cutting motion control flow illustrated in FIG. 2 as well as FIG. 1. First, at step S1, the numerical control section 16 (the spindle-axis command outputting section 26) instructs the total rotation amount S0 and maximum rotation speed V0 of the spindle axis 12 to the spindle-axis control section 18. At step S2, the spindle-axis control section 18 (the initial-motion control section 30, the maximum-acceleration detecting section 32 and the residual rotation-amount detecting section 34) makes the spindle axis 12 perform the accelerated rotation at maximum capacity using the maximum permissible current of the drive source to perform the cutting motion from the process start position, with the maximum rotation speed V0 set as a target speed, detects the maximum acceleration A0 during the accelerated rotation at maximum capacity, and sequentially detects the residual rotation amount Sr from the current position. The spindle-axis control section 18 notifies the detected residual rotation amount Sr to the numerical control section 16 every time it is detected.

Next, at step S3, the spindle-axis control section 18 (the current-speed detecting section 36) sequentially detects the current speed Vc during the accelerated rotation at maximum capacity, and judges whether the current speed Vc has not reached the maximum rotation speed V0 every time it is detected. If Vc has not yet reached V0, the spindle-axis control section 18 judges, at step S4, whether the residual rotation amount Sr is equal to or less than one-half of the total rotation amount S0. If Sr is equal to or less than one-half of S0, the spindle-axis control section 18 makes, at step S5, the spindle axis 12 perform the decelerated rotation at maximum capacity using the maximum permissible current of the drive source, so as to continuously perform the cutting motion. If Sr is not equal to or not less than one-half of S0, the control flow returns to step S3.

Figure 3:
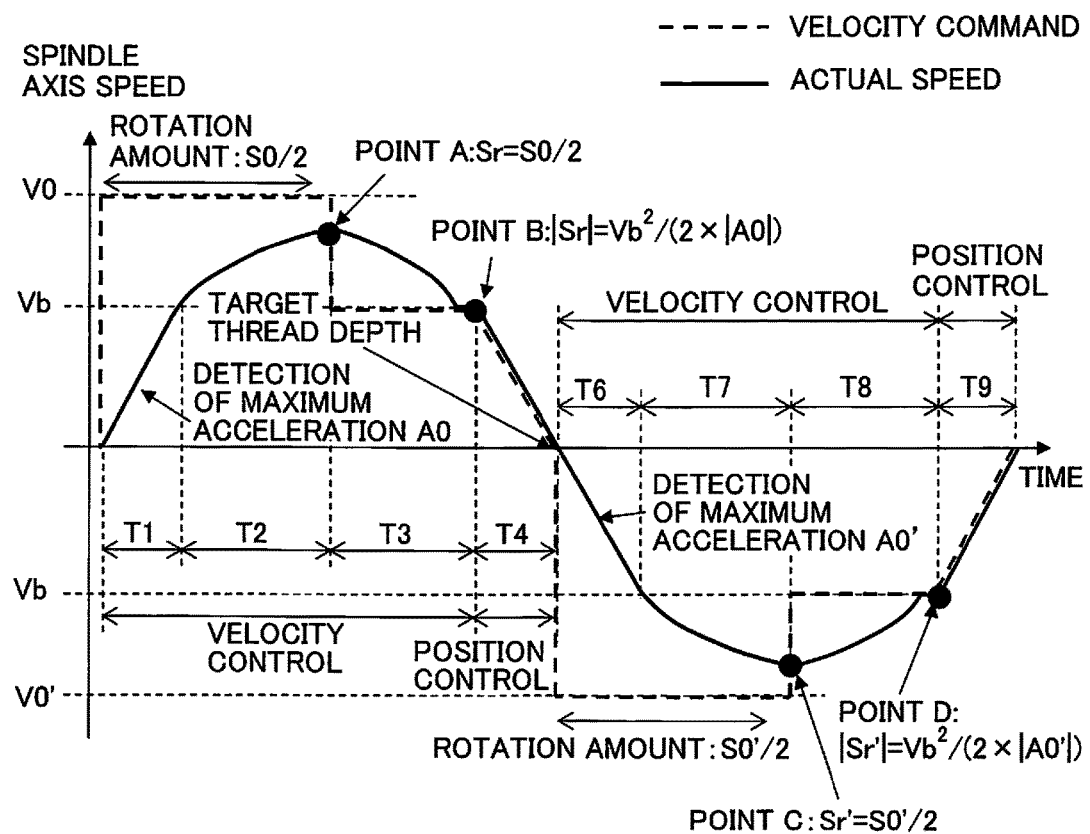
FIG. 3 is a diagram showing one example of the motion of a spindle axis in the embodiment of FIG. 2.

Referring now to FIG. 3, one example of the cutting motion of the spindle axis 12, in the case where the residual rotation amount Sr reaches one-half of the total rotation amount S0 before the current speed Vc reaches the maximum rotation speed V0 (i.e., in the case where the judgment results at respective steps S3 and S4 are YES), is depicted by a speed-time curve (the curve above a time axis). In FIG. 3, a rotational speed Vb (e.g., the base speed of the spindle motor) is previously determined for the spindle axis 12, such that an acceleration with a constant torque (i.e., a constant acceleration) can be performed from the start of operation to the speed Vb, and may be stored as one of control parameters in a memory (not shown) of the controller 10. In practice, the speed Vb may take any value equal to or less than the base speed of the spindle motor (or a speed determined by taking into account a reduction ratio, if any, between the spindle motor and the spindle axis 12).

The accelerated rotation at maximum capacity of the spindle axis 12 at step S2 is performed during time periods T1 and T2 shown in FIG. 3, and the maximum acceleration A0 is detected during the constant acceleration in the time period T1 (i.e., a time period from a point when the spindle axis starts at the process start position to a point when the spindle axis reaches the speed Vb). When the rotational speed of the spindle axis 12 exceeds Vb, the acceleration of the spindle axis 12 gradually decreases from the maximum acceleration A0 due to the characteristics of the spindle motor. At a time point A when the residual rotation amount Sr reaches one-half of the total rotation amount S0 (i.e., when the rotation amount from the start of processing reaches one-half of the total rotation amount S0) (or when the judgment result at step S4 becomes YES), the motion of the spindle axis 12 changes from the accelerated rotation to the decelerated rotation, and in time period T3, the spindle axis 12 performs the decelerated rotation at maximum capacity at step S5.

During the time period T3 (step S5), the spindle-axis control section 18 makes the spindle axis 12 to perform the decelerated rotation from the point A by a velocity control in which the speed Vb is set as a target value, and the deceleration of the spindle axis 12 is gradually increased due to the characteristics of the spindle motor. During the decelerated rotation at maximum capacity, the spindle-axis control section 18 (the residual rotation-amount detecting section 34 and the current-speed detecting section 36) also sequentially detects the residual rotation amount Sr from the current position and the current speed Vc, of the spindle axis 12. In this way, in the time periods T1, T2 and T3, the spindle-axis control section 18 executes a velocity control for the spindle axis 12 (a step-wise velocity command is illustrated by a broken line in FIG. 3).

After step S5, the spindle-axis control section 18 (the positioning-motion control section 38) monitors the residual rotation amount Sr and the current speed Vc, which are sequentially detected, and determines a position of a time point B (FIG. 3), at which it is expected that Sr becomes equal to zero and Vc becomes equal to zero (i.e., the spindle axis reaches the target thread depth) if the spindle axis 12 is decelerated from the current speed Vc (hereinafter described as a rotation number per second (unit thereof being represented as rev/s)) of that time point at the maximum deceleration A0 (negative value) corresponding to the maximum acceleration A0 (rev/s$^2$) detected at step S2. The position of the point B is determined, as the absolute value of the residual rotation amount Sr (negative value) as seen from the point of Sr=0, by the following equation:

$$|Sr|=Vc^2/(2\times|A0|)$$

based on a formula:

$$Vc^2=2\times|A0|\times|Sr|$$

In this embodiment, it is premised that the spindle axis 12 is decelerated at the constant maximum deceleration A0 from the point B, in order to facilitate a calculation for a position control from the point B until the target thread depth. Accordingly, it is assumed that the current speed Vc of the spindle axis 12 has reached Vb at the point B. As a result, the position |Sr| of the point B can be determined as:

$$|Sr|=Vb^2/(2\times|A0|)$$

It is also assumed, in this embodiment, that a torque necessary for acceleration of the spindle axis 12 (hereinafter referred to as an acceleration torque) is equal to a torque necessary for deceleration of the spindle axis 12 (hereinafter referred to as a deceleration torque). In general, mechanical load (or resistance) arises during the rotation of the spindle axis 12 and thus the acceleration torque becomes larger than the deceleration torque. Therefore, if the acceleration torque is equal to the deceleration torque, a time required for the acceleration at maximum capacity becomes longer than a time required for the deceleration at maximum capacity provided that the changes of speed thereof correspond to each other. Accordingly, in practice, the spindle axis 12 decelerating from the point A reaches the speed Vb in a time period shorter than the time period T2, and the position |Sr| is represented by:

$$|Sr|>Vc^2/(2\times|A0|)$$

and thereafter, the spindle axis 12 rotates at the constant speed Vb for a very short time, so as to reach the point B represented by:

$$|Sr|=Vb^2/(2\times|A0|)$$

(see FIG. 3).

Turning back to FIG. 2, at step S6, the spindle-axis control section 18 (the positioning-motion control section 38) judges whether the absolute value |Sr| of the residual rotation amount Sr of the spindle axis 12 satisfies the equation: $|Sr|=Vb^2/(2\times|A0|)$ (hereinafter referred to as equation 1) (i.e., whether or not the rotational position of the spindle axis 12 has reached the point B). If the equation 1 is satisfied, the spindle-axis control section 18 (the positioning-motion control section 38) prepares, at step S7, a command for making the spindle axis 12 perform the decelerated rotation at the maximum deceleration A0 and reach the point of Sr=0 (i.e., the target thread depth) (in the motion example of FIG. 3, a command for stopping the spindle axis 12 at the target thread depth), and executes a position control for the spindle axis 12 with use of the prepared command. If the equation 1 is not satisfied, the judgment at step S6 is repeated until the equation 1 is satisfied. The spindle axis 12 performs, in accordance with the command from the spindle-axis control section 18 (the positioning-motion control section 38), the cutting motion from the point B toward the target thread depth, by performing the decelerated rotation at the maximum deceleration A0, and reaches the target thread depth when Sr becomes equal to zero (in the motion example of FIG. 3, the spindle axis is stopped at the target thread depth). In this way, in the time period T4 (FIG. 3) in which the spindle axis operates from the point B to reach the target thread depth, the spindle-axis control section 18 executes a position control for the spindle axis 12 (a velocity command at a constant acceleration, obtained from a position command, is shown by a broken line).

If it is judged, at step S3, that the current speed Vc has reached the maximum rotation speed V0, the spindle-axis control section 18 stores, at step S8, a rotation amount (i.e., a rotational position FBS) of the spindle axis 12 from the process start position at an instant when the spindle axis reaches the maximum rotation speed V0, as an acceleration rotation amount Sa. Then, at step S9, the spindle-axis control section 18 judges whether the residual rotation amount Sr is equal to or less than the acceleration rotation amount Sa. If Sr is equal to or less than Sa, the control flow goes to step S5, and subsequently executes steps S6 and S7, so as to perform the cutting motion until the target thread depth. If Sr is not equal to or not less than Sa, the judgment at step S9 is repeated until Sr becomes equal to or less than Sa.

Figure 4:
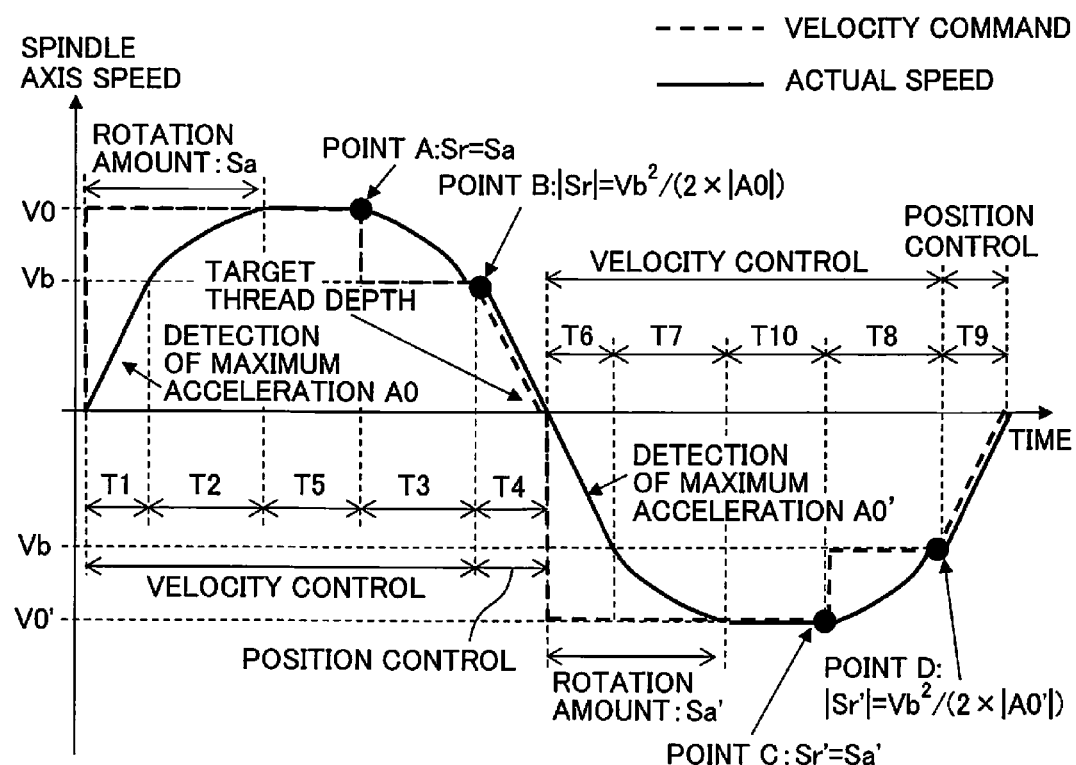
FIG. 4 is a diagram showing another example of the motion of the spindle axis in the embodiment of FIG. 2.

Referring now to FIG. 4, one example of the cutting motion of the spindle axis 12, in the case where the current speed Vc reaches the maximum rotation speed V0 before the residual rotation amount Sr reaches one-half of the total rotation amount S0 (i.e., in the case where the judgment result at step S3 is No), is depicted by a speed-time curve (the curve above a time axis). As shown in FIG. 4, the accelerated rotation of the spindle axis 12 at maximum capacity at step S2 is performed during time periods T1 and T2, and the maximum acceleration A0 is detected during the constant acceleration in the time period T1 (i.e., a time period from a point when the spindle axis starts at the process start position to a point when the spindle axis reaches the speed Vb). When the rotational speed of the spindle axis 12 exceeds Vb, the acceleration of the spindle axis 12 gradually decreases from the maximum acceleration A0 due to the characteristics of the spindle motor. The current speed Vc of the spindle axis 12 reaches the maximum rotation speed V0 before the residual rotation amount Sr reaches one-half of the total rotation amount S0. Thereafter, the spindle axis 12 rotates at the constant speed V0 (i.e., null acceleration) over time period T5 so as to continue the cutting motion. At a time point A when the residual rotation amount Sr becomes equal to the acceleration rotation amount Sa (i.e., when the judgment result at S9 becomes YES), the motion of the spindle axis 12 changes from the accelerated rotation to the decelerated rotation. Then, in time period T3 (step S5), the spindle axis 12 performs the decelerated rotation at maximum capacity (by the velocity control), and in time period T4 (step S7), the spindle axis 12 performs the decelerated rotation (by the position control) at the maximum deceleration A0. The spindle axis 12 reaches the target thread depth when Sr becomes equal to zero (in the motion example of FIG. 4, the spindle axis is stopped at the target thread depth). In the time periods T1, T2, T3 and T4, the spindle axis 12 operates in the same manner as the motion shown in FIG. 3.

In the motion examples shown in FIGS. 3 and 4, during a period when the spindle-axis control section 18 controls the rotational motion of the spindle axis 12 from the process start position to the target thread depth, the feed-axis control section 22 (FIG. 1) controls the feed axis 14 so as to perform a feed motion while following the motion of the spindle axis 12, with use of the rotational position FBS of the spindle axis 12. During a period when the spindle-axis control section 18 executes the processes from step S1 to step S9, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

When the position control is executed to make the spindle axis 12 reach the target thread depth as described above, it is desirable to monitor an overshoot of the spindle axis 12 relative to the target thread depth, which may result from structural factors of the machine tool. The excessive overshoot of the spindle axis 12 relative to the target thread depth is associated with the excessive overshoot of the feed axis 14 that operates to follow the spindle axis 12, which may arise difficulty in ensuring a required dimensional accuracy of, in particular, a bottomed internal thread that does not penetrate a workpiece. A conventional controller for tapping generally has a configuration wherein a numerical control section monitors an overshoot of a spindle axis relative to a target thread depth, based on data such as a residual rotation amount notified from a spindle-axis control section, and when it is judged that the overshoot is excessive, the numerical control section provides the spindle-axis control section with an urgent command such as a forced outage of the spindle axis. In contrast, the controller 10 has a configuration wherein the overshoot detecting section 40 of the spindle-axis control section 18 detects the overshoot Ov of the spindle axis 12 relative to the target thread depth, based on the residual rotation amount Sr sequentially detected in the residual rotation-amount detecting section 34, and thereby it is possible to perform urgent countermeasures, such as a forced outage of the spindle axis 12, if desired. Examples of processes of monitoring an overshoot, executed by the spindle-axis control section 18, will be described below with reference to FIGS. 5A and 5B that show several steps subsequent to the cutting motion control process of FIG. 2. Note that the exemplary processes shown in FIGS. 5A and 5B may be applied to any of the motion examples of FIGS. 3 and 4.

In one example of the overshoot monitoring process shown in FIG. 5A, first, the spindle-axis control section 18 (the overshoot detecting section 40) detects, at step S10, the overshoot Ov of the spindle axis 12 relative to the target thread depth at a time when the spindle axis 12 reaches the target thread depth (i.e., Vc becomes equal to zero), as an actual measurement value of the residual rotation amount Sr, based on the sequentially detected residual rotation amount Sr and current speed Vc. Next, the spindle-axis control section 18 (the positioning-motion control section 38) continuously monitors the overshoot Ov and judges, at step S11, whether or not the overshoot Ov exceeds a predetermined permissible value Op. If it is judged that the overshoot Ov exceeds the predetermined permissible value Op, the spindle-axis control section 18 (the positioning-motion control section 38) sets, at the moment of the judgment, a position command for the spindle axis 12 at zero (or null command) and thereby immediately stops the spindle axis 12, at step S12, so as to force-quit the cutting motion control flow. If it is judged that the overshoot Ov does not exceed the predetermined permissible value Op, a position command for the spindle axis 12 is maintained and the cutting motion control flow is finished in a condition where it is shiftable to a return motion control flow of the spindle axis 12 as described later, without force-quitting the cutting motion control flow.

In the other example of the overshoot monitoring process shown in FIG. 5B, steps S10 and S11, which are identical to steps S10 and S11 of FIG. 5A, are executed. If it is judged, at step S11, that the overshoot Ov exceeds the predetermined permissible value Op, the spindle-axis control section 18 (the positioning-motion control section 38) provides, at the moment of the judgment, the spindle axis 12 with a command for making the spindle axis 12 perform a reverse motion until the target thread depth, or alternatively, a command for making the spindle axis 12 perform a reverse motion until a position at the moment of the judgment that the overshoot Ov exceeds the permissible value Op, and thereby stops the spindle axis 12 when the reverse motion according to the command is completed, at step S12', so as to force-quit the cutting motion control flow. If it is judged that the overshoot Ov does not exceed the predetermined permissible value Op, a position command for the spindle axis 12 is maintained and the cutting motion control flow is finished in a condition where it is shiftable to a return motion control flow of the spindle axis 12 as described later, without force-quitting the cutting motion control flow.

In the process examples shown in FIGS. 5A and 5B, during a period from the moment when the spindle-axis control section 18 (the positioning-motion control section 38) judges that the overshoot Ov exceeds the permissible value Op until the instant when the positioning-motion control section 38 stops the spindle axis 12, the feed-axis control section 22 (FIG. 1) controls the feed motion of the feed axis 14 so as to follow the motion of the spindle axis 12, with use of the rotational position FBS of the spindle axis 12, and thereby stops the feed axis 14 synchronously with the spindle axis 12.

Also in the process examples shown in FIGS. 5A and 5B, after the spindle-axis control section 18 has force-quitted the cutting motion control flow, the numerical control section 16, for example, may be configured to output an alarm signal based on the force-quitting signal notified from the spindle-axis control section 18 and thereby inform an operator of the force-quit of the cutting motion (i.e., the abnormality in the overshoot Ov of the spindle axis 12).

Figure 6:
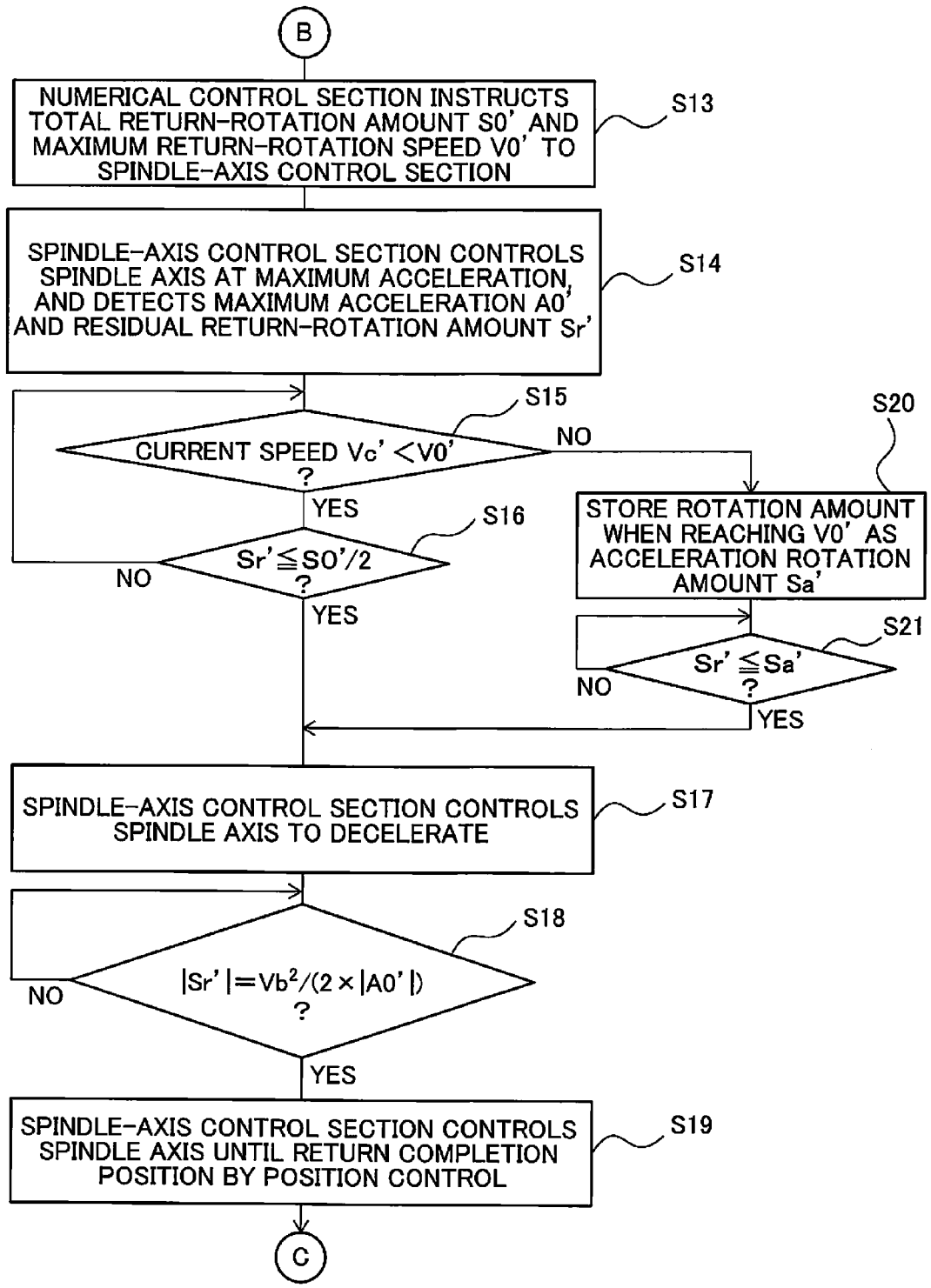
FIG. 6 is a flowchart showing a return motion control method for a tapping process, which is one embodiment of a machine tool control method.

In a tapping process using a machine tool, it is necessary to perform a return motion of the spindle axis 12 for pulling out a tool from a workpiece after a pilot hole is cut to the workpiece until a target thread depth. In the case where the aforementioned embodiment has a configuration wherein the positioning-motion control section 38 makes the spindle axis 12 stop at the target thread depth, the controller 10 is capable of controlling the return motion in a manner similar to the aforementioned control of the cutting motion from the process start position to the target thread depth. FIG. 6 shows a return motion control method adapted to be performed for the spindle axis 12 in a tapping process, as one embodiment of a method of controlling a machine tool executed by the controller 10. FIGS. 3 and 4 show one example of the return motion of the spindle axis 12, corresponding to the aforementioned cutting motion of the spindle axis 12, by a speed-time curve (the curve below a time axis), in addition to the cutting motion. With reference to FIGS. 3, 4 and 6 in addition to FIG. 1, one example of a control flow of the return motion executed by the controller 10 will be described below.

After it is judged that the tapping process has reached the target thread depth in the process flow shown in FIG. 2 and the spindle-axis control section 18 judges that the overshoot Ov does not exceed the predetermined permissible value Op in, e.g., the process example of FIG. 5A or 5B, the numerical control section 16 (the spindle-axis command outputting section 26) obtains, at step S13, a total return-rotation amount S0' and a maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as a spindle-axis command CS to the spindle-axis control section 18. The spindle-axis command CS for the return motion also does not include a position command and/or an acceleration/deceleration command, which makes the spindle axis 12 perform a rotational motion until the return completion position. Note that the return completion position may be the same as the process start position, or may be different from the process start position. In the case where the return completion position coincides with the process start position, the total return-rotation amount S0' is equal to the total rotation amount S0 in the cutting motion, but the maximum return-rotation speed V0' is not always equal to the maximum rotation speed V0 in the cutting motion. Also, if the total return-rotation amount S0' and the maximum return-rotation speed V0' are equal to the total rotation amount S0 and the maximum rotation speed V0 in the cutting motion, the return motion is depicted by the substantially same speed-time curve as that of the cutting motion, but if the total return-rotation amount S0' and the maximum return-rotation speed V0' are different from the total rotation amount S0 and the maximum rotation speed V0 in the cutting motion, the return motion is not always depicted by the same speed-time curve as that of the cutting motion.

At step S14, the spindle-axis control section 18 (the initial-motion control section 30, the maximum-acceleration detecting section 32 and the residual rotation-amount detecting section 34) executes the following processes. The initial-motion control section 30 makes the spindle axis 12 perform an accelerated inverse rotation at maximum capacity using the maximum permissible current of the drive source from the target thread depth (i.e., zero speed), by a velocity control in which the maximum return-rotation speed V0' is set as a target value, so as to perform the return motion. The maximum-acceleration detecting section 32 detects a maximum acceleration A0' of inverse rotation of the spindle axis 12, during the accelerated inverse rotation at maximum capacity from the target thread depth, based on the rotational position FBS. The residual rotation-amount detecting section 34 sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected.

Next, at step S15, the spindle-axis control section 18 (the current-speed detecting section 36) sequentially detects a current speed Vc' of inverse rotation of the spindle axis 12, based on the rotational position FBS during the accelerated inverse rotation at maximum capacity, and judges whether the current speed Vc' has not reached the maximum return-rotation speed V0' every time it is detected. If Vc' has not reached V0', the spindle-axis control section 18 judges, at step S16, whether the residual return-rotation amount Sr' is equal to or less than one-half of the total return-rotation amount S0'. If Sr' is equal to or less than one-half of S0', the spindle-axis control section 18 makes, at step S17, the spindle axis 12 perform a decelerated inverse rotation at maximum capacity using the maximum permissible current of the drive source, so as to continuously perform the return motion. If Sr' is not equal to or not less than one-half of S0', the control flow returns to step S15.

Referring now to FIG. 3, one example of the return motion of the spindle axis 12, in the case where the residual return-rotation amount Sr' reaches one-half of the total return-rotation amount S0' before the current speed Vc' of inverse rotation reaches the maximum return-rotation speed V0' (i.e., in the case where the judgment results at respective steps S15 and S16 are YES), is depicted by a speed-time curve (the curve below a time axis). The accelerated inverse rotation at maximum capacity of the spindle axis 12 at step S14 is performed during time periods T6 and T7 shown in FIG. 3, and the maximum acceleration A0' of inverse rotation is detected during the constant acceleration in the time period T6 (i.e., a time period from a point when the spindle axis starts at the target thread depth to a point when the spindle axis reaches the aforementioned speed Vb (of the inverse rotation)). When the rotational speed of the spindle axis 12 exceeds Vb, the acceleration of the spindle axis 12 gradually decreases from the maximum acceleration A0' due to the characteristics of the spindle motor. At a time point C when the residual return-rotation amount Sr' reaches one-half of the total return-rotation amount S0' (i.e., when the rotation amount from the start of returning reaches one-half of the total return-rotation amount S0') (or when the judgment result at step S16 becomes YES), the motion of the spindle axis 12 changes from the accelerated inverse rotation to the decelerated inverse rotation, and in time period T8, the spindle axis 12 performs the decelerated inverse rotation at maximum capacity at step S17.

During the time period T8 (step S17), the spindle-axis control section 18 makes the spindle axis 12 to perform the decelerated inverse rotation from the point C by a velocity control in which the speed Vb is set as a target value, and the deceleration of inverse rotation of the spindle axis 12 is gradually increased due to the characteristics of the spindle motor. During the decelerated inverse rotation at maximum capacity, the spindle-axis control section 18 (the residual rotation-amount detecting section 34 and the current-speed detecting section 36) also sequentially detects the residual return-rotation amount Sr' from the current position and the current speed Vc' of inverse rotation, of the spindle axis 12. In this way, in the time periods T6, T7 and T8, the spindle-axis control section 18 executes a velocity control for the spindle axis 12 (a step-wise velocity command is illustrated by a broken line in FIG. 3).

After step S17, the spindle-axis control section 18 (the positioning-motion control section 38) monitors the residual return-rotation amount Sr' and the current speed Vc' of inverse rotation, which are sequentially detected, and determines a position of a time point D (FIG. 3), at which it is expected that Sr' becomes equal to zero and Vc' becomes equal to zero (i.e., the spindle axis reaches the return completion position) if the spindle axis 12 is decelerated from the current speed Vc' (hereinafter described as a rotation number per second (unit thereof being represented as rev/s)) of that time point at the maximum deceleration A0' (negative value) corresponding to the maximum acceleration A0' (rev/s²) detected at step S14. The position of the point D is determined, analogously to the aforementioned determination of the position of the point B, by the following equation:

$$|Sr'|=Vb^2/(2=|A0'|)$$

In this embodiment, it is premised that the spindle axis 12 is decelerated at the constant maximum deceleration A0' (negative value) (corresponding to the maximum acceleration A0' of inverse rotation) from the point D, in order to facilitate a calculation for a position control from the point D until the return completion position. Accordingly, it is assumed that the current speed Vc' of the spindle axis 12 has reached Vb at the point D.

It is also assumed, in this embodiment, that a torque necessary for acceleration of the spindle axis 12 (hereinafter referred to as an acceleration torque) is equal to a torque necessary for deceleration of the spindle axis 12 (hereinafter referred to as a deceleration torque). Accordingly, in practice, the spindle axis 12 decelerating from the point C reaches the speed Vb in a time period shorter than the time period T7, analogously to the aforementioned motion just before the point B, and the position |Sr'| is represented by:

$$|Sr'|>Vc^2/(2\times|A0'|)$$

and thereafter, the spindle axis 12 rotates at the constant speed Vb for a very short time, so as to reach the point D represented by:

$$|Sr'|=Vb^2/(2\times|A0'|)$$

(see FIG. 3).

Turning back to FIG. 6, at step S18, the spindle-axis control section 18 (the positioning-motion control section 38) judges whether the absolute value |Sr'| of the residual return-rotation amount Sr' of the spindle axis 12 satisfies the equation:

$$|Sr'|=Vb^2/(2\times|A0'|)$$

(hereinafter referred to as equation 2) (i.e., whether or not the rotational position of the spindle axis 12 has reached the point D). If the equation 2 is satisfied, the spindle-axis control section 18 (the positioning-motion control section 38) prepares, at step S19, a command for making the spindle axis 12 perform the decelerated inverse rotation at the maximum deceleration A0' and stop at the point of Sr'=0 (i.e., the return completion position), and executes a position control for the spindle axis 12 with use of the prepared command. If the equation 2 is not satisfied, the judgment at step S18 is repeated until the equation 2 is satisfied. The spindle axis 12 performs, in accordance with the command from the spindle-axis control section 18 (the positioning-motion control section 38), the return motion from the point D toward the return completion position, by performing the decelerated inverse rotation at maximum deceleration A0', and reaches and stops at the return completion position when Sr' becomes equal to zero. In this way, in the time period T9 (FIG. 3) in which the spindle axis operates from the point D to reach the return completion position, the spindle-axis control section 18 executes a position control for the spindle axis 12 (a velocity command at a constant acceleration, obtained from a position command, is shown by a broken line).

If it is judged, at step S15, that the current speed Vc' has reached the maximum return-rotation speed V0', the spindle-axis control section 18 stores, at step S20, a rotation amount of the spindle axis 12 from the target thread depth (i.e., a rotational position FBS) at an instant when the spindle axis reaches the maximum return-rotation speed V0', as an acceleration rotation amount Sa' of the return motion. Then, at step S21, the spindle-axis control section 18 judges whether the residual return-rotation amount Sr' is equal to or less than the acceleration rotation amount Sa'. If Sr' is equal to or less than Sa', the control flow goes to step S17, and subsequently executes steps S18 and S19, so as to perform the return motion until the return completion position. If Sr' is not equal to or not less than Sa', the judgment at step S21 is repeated until Sr' becomes equal to or less than Sa'.

Referring now to FIG. 4, one example of the return motion of the spindle axis 12, in the case where the current speed Vc' of inverse rotation reaches the maximum return-rotation speed V0' before the residual return-rotation amount Sr' reaches one-half of the total return-rotation amount S0' (i.e., in the case where the judgment result at step S15 is No), is depicted by a speed-time curve (the curve below a time axis). As shown in FIG. 4, the accelerated inverse rotation of the spindle axis 12 at maximum capacity at step S14 is performed during time periods T6 and T7, and the maximum acceleration A0' of inverse rotation is detected during a constant acceleration in time period T6 (i.e., a time period from a point when the spindle axis starts at the target thread depth to a point when the spindle axis reaches the aforementioned speed Vb (of the inverse rotation)). When the rotational speed of the spindle axis 12 exceeds Vb, the acceleration of the spindle axis 12 gradually decreases from the maximum acceleration A0' due to the characteristics of the spindle motor. The current speed Vc' of the spindle axis 12 reaches the maximum return-rotation speed V0' before the residual return-rotation amount Sr' reaches one-half of the total return-rotation amount S0', and thereafter, the spindle axis 12 inversely rotates at the constant speed V0' (i.e., null acceleration) over time period T10 so as to continue the return motion. At a time point C when the residual return-rotation amount Sr' becomes equal to the acceleration rotation amount Sa' (i.e., when the judgment result at S21 becomes YES), the motion of the spindle axis 12 changes from the accelerated inverse rotation to the decelerated inverse rotation. Then, in time period T8 (step S17), the spindle axis 12 performs the decelerated inverse rotation at maximum capacity (by the velocity control), and in time period T9 (step S19), the spindle axis 12 performs the decelerated inverse rotation (by the position control) at the maximum deceleration A0'. In the time periods T6, T7, T8 and T9, the spindle axis 12 operates in the same manner as the motion shown in FIG. 3.

In the motion examples shown in FIGS. 3 and 4, during a period when the spindle-axis control section 18 controls the inverse rotational motion of the spindle axis 12 from the target thread depth to the return completion position, the feed-axis control section 22 (FIG. 1) controls the feed axis 14 so as to perform an inverse feed motion while following the motion of the spindle axis 12, with use of the rotational position FBS of the spindle axis 12. During a period when the spindle-axis control section 18 executes the processes from step S13 to step S21, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

When the position control is executed to make the spindle axis 12 reach the return completion position as described above, it is desirable to monitor an overshoot of the spindle axis 12 relative to the return completion position, which may result from structural factors of the machine tool. The excessive overshoot of the spindle axis 12 relative to the return completion position is associated with the excessive overshoot of the feed axis 14 that operates to follow the spindle axis 12, which may arise, e.g., an unexpected interference between a mechanical component performing an inverse feed motion by the feed axis and a nearby object. A conventional controller for tapping generally has a configuration wherein a numerical control section monitors an overshoot of a spindle axis relative to a return completion position, based on data such as a residual rotation amount notified from a spindle-axis control section, and when it is judged that the overshoot is excessive, the numerical control section provides the spindle-axis control section with an urgent command such as a forced outage of the spindle axis. In contrast, the controller 10 has a configuration wherein the overshoot detecting section 40 of the spindle-axis control section 18 detects the overshoot Ov of the spindle axis 12 relative to the return completion position, based on the residual return-rotation amount Sr' sequentially detected in the residual rotation-amount detecting section 34, and thereby it is possible to perform urgent countermeasures, such as a forced outage of the spindle axis 12, if desired. Examples of processes of monitoring an overshoot, executed by the spindle-axis control section 18, will be described below with reference to FIGS. 7A and 7B that show several steps subsequent to the return motion control process of FIG. 6. Note that the exemplary processes shown in FIGS. 7A and 7B may be applied to any of the motion examples of FIGS. 3 and 4.

In one example of the overshoot monitoring process shown in FIG. 7A, first, the spindle-axis control section 18 (the overshoot detecting section 40) detects, at step S22, the overshoot Ov of the spindle axis 12 relative to the return completion position at a time when the spindle axis 12 reaches the return completion position (i.e., Vc' becomes equal to zero), as an actual measurement value of the residual return-rotation amount Sr', based on the sequentially detected residual return-rotation amount Sr' and current speed Vc'. Next, the spindle-axis control section 18 (the positioning-motion control section 38) continuously monitors the overshoot Ov and judges, at step S23, whether or not the overshoot Ov exceeds a predetermined permissible value Op. If it is judged that the overshoot Ov exceeds the predetermined permissible value Op, the spindle-axis control section 18 (the positioning-motion control section 38) sets, at the moment of the judgment, a position command for the spindle axis 12 at zero (or null command) and thereby immediately stops the spindle axis 12, at step S24, so as to force-quit the return motion control flow. If it is judged that the overshoot Ov does not exceed the predetermined permissible value Op, a position command for the spindle axis 12 is maintained and the return motion control flow is finished with the stoppage of the spindle axis 12, without force-quitting the return motion control flow.

In the other example of the overshoot monitoring process shown in FIG. 7B, steps S22 and S23, which are identical to steps S22 and S23 of FIG. 7A, are executed. If it is judged, at step S23, that the overshoot Ov exceeds the predetermined permissible value Op, the spindle-axis control section 18 (the positioning-motion control section 38) provides, at the moment of the judgment, the spindle axis 12 with a command for making the spindle axis 12 perform a reverse motion until the return completion position, or alternatively, a command for making the spindle axis 12 perform a reverse motion until a position at the moment of the judgment that the overshoot Ov exceeds the permissible value Op, and thereby stops the spindle axis 12 when the reverse motion according to the command is completed, at step S24', so as to force-quit the return motion control flow. If it is judged that the overshoot Ov does not exceed the predetermined permissible value Op, a position command for the spindle axis 12 is maintained and the return motion control flow is finished with the stoppage of the spindle axis 12, without force-quitting the return motion control flow.

In the process examples shown in FIGS. 7A and 7B, during a period from the moment when the spindle-axis control section 18 (the positioning-motion control section 38) judges that the overshoot Ov exceeds the permissible value Op until the instant when the positioning-motion control section 38 stops the spindle axis 12, the feed-axis control section 22 (FIG. 1) controls the inverse feed motion of the feed axis 14 so as to follow the motion of the spindle axis 12, with use of the rotational position FBS of the spindle axis 12, and thereby stops the feed axis 14 synchronously with the spindle axis 12.

Also in the process examples shown in FIGS. 7A and 7B, after the spindle-axis control section 18 has force-quitted the return motion control flow, the numerical control section 16, for example, may be configured to output an alarm signal based on the force-quitting signal notified from the spindle-axis control section 18 and thereby inform an operator of the force-quit of the return motion (i.e., the abnormality in the overshoot Ov of the spindle axis 12).

The controller 10 according to the embodiment depicted in FIGS. 1 to 7B has a configuration wherein, when the spindle axis 12 is made to perform the cutting motion from the process start position to the target thread depth, the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the maximum acceleration A0 during the accelerating step and the sequentially detected residual rotation amount Sr and current speed Vc of the spindle axis 12, the cutting motion until the target thread depth in the shortest time while decelerating the spindle axis 12 at the maximum deceleration A0 so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, when the spindle axis 12 reaches the target thread depth, the spindle-axis control section 18 (the overshoot detecting section 40) detects the overshoot Ov of the spindle axis 12 relative to the target thread depth based on the sequentially detected residual rotation amount Sr. According to this configuration, it is possible to eliminate a time consumed in transmitting or receiving data or instructions between the numerical control section 16 and the spindle-axis control section 18, in comparison with the configuration of the conventional tapping controller, wherein the numerical control section monitors the overshoot of the spindle axis relative to the target thread depth, based on the data notified from the spindle-axis control section, and provides the spindle-axis control section with the urgent command at the time of abnormal overshoot. Therefore, according to the controller 10, it is possible to quickly judge whether the overshoot Ov of the spindle axis 12 relative to the target thread depth is abnormal or not, and to promptly perform urgent countermeasures, such as a forced outage of the spindle axis 12, when the abnormal overshoot occurs, so that it is possible to ensure a dimensional accuracy required for the tapping process.

In addition, the controller 10 according to the above embodiment has a configuration wherein, when the spindle axis 12 is made to perform the return motion from the target thread depth to the return completion position, the numerical control section 16 instructs only the total return-rotation amount S0' and the maximum return-rotation speed V0', of the spindle axis 12, as the spindle axis command CS to the spindle-axis control section 18, and the spindle-axis control section 18 performs, in accordance with the spindle axis command CS, the return motion by accelerating the spindle axis 12 with the maximum power using the maximum permissible current, aiming at the maximum return-rotation speed V0', and continuously performs, based on the maximum acceleration A0' during the accelerating step and the sequentially detected residual return-rotation amount Sr' and current speed Vc' of the spindle axis 12, the return motion until the return completion position in the shortest time while decelerating the spindle axis 12 at the maximum deceleration A0' so as to make the spindle axis stop at the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, when the spindle axis 12 reaches the return completion position, the spindle-axis control section 18 (the overshoot detecting section 40) detects the overshoot Ov of the spindle axis 12 relative to the return completion position based on the sequentially detected residual return-rotation amount Sr'. According to this configuration, it is possible to eliminate a time consumed in transmitting or receiving data or instructions between the numerical control section 16 and the spindle-axis control section 18, in comparison with the configuration of the conventional tapping controller, wherein the numerical control section monitors the overshoot of the spindle axis relative to the return completion position, based on the data notified from the spindle-axis control section, and provides the spindle-axis control section with the urgent command at the time of abnormal overshoot. Therefore, according to the controller 10, it is possible to quickly judge whether the overshoot Ov of the spindle axis 12 relative to the return completion position is abnormal or not, and to promptly perform urgent countermeasures, such as a forced outage of the spindle axis 12, when the abnormal overshoot occurs, so that it is possible, e.g., to prevent an interference from being unexpectedly caused between a mechanical component performing an inverse feed motion by the feed axis 14 and a nearby object.

Figure 8:
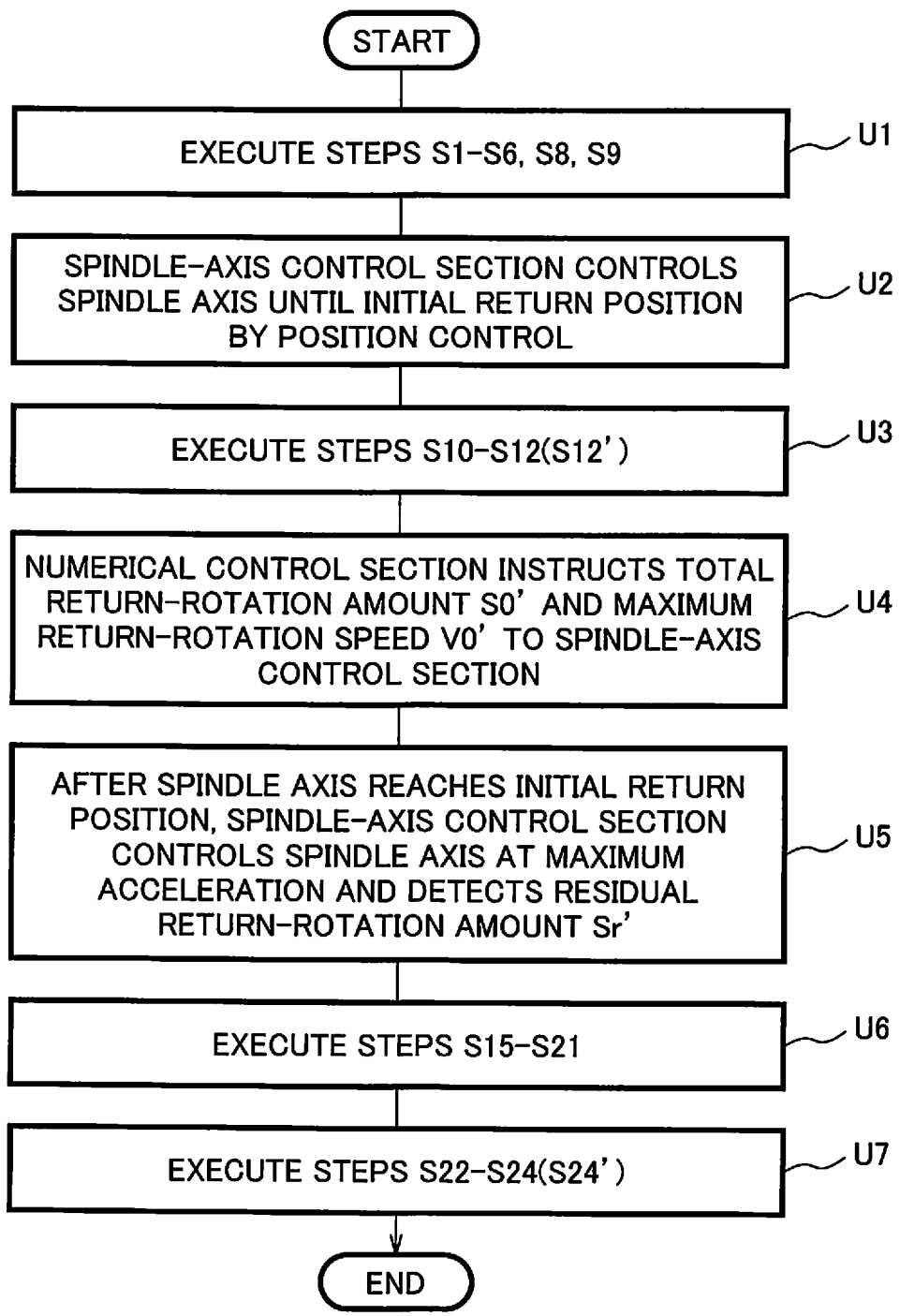
FIG. 8 is a flowchart showing a cutting and return motion control method for a tapping process, which is another embodiment of a machine tool control method.
Figure 9:
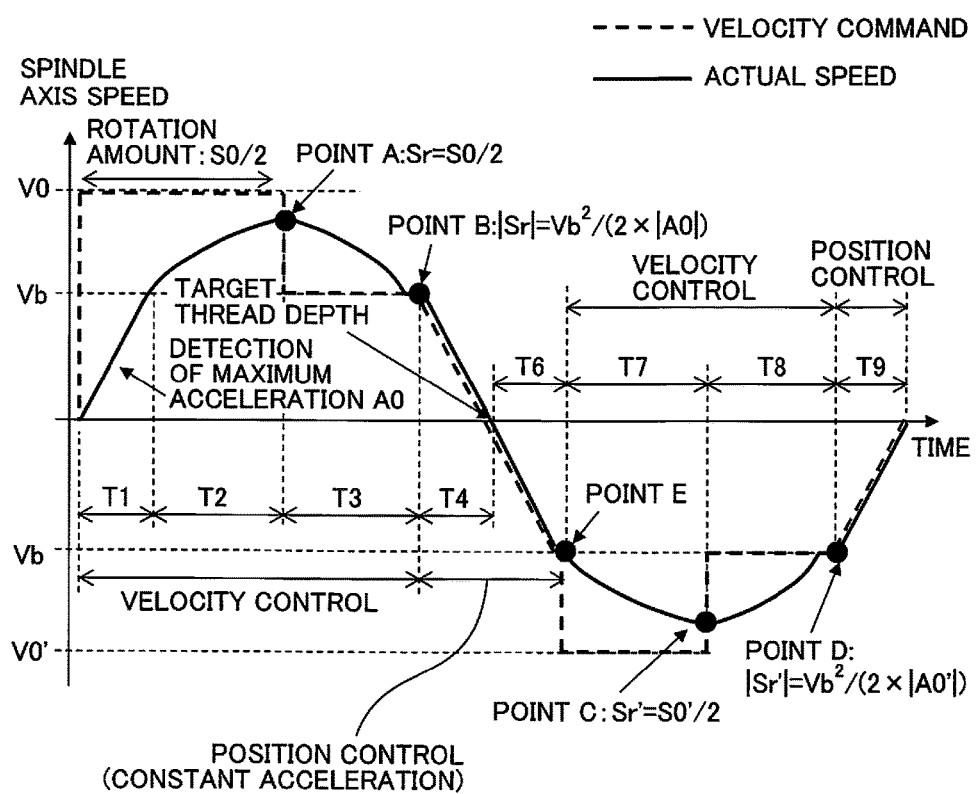
FIG. 9 is a diagram showing one example of the motion of the spindle axis in the embodiment of FIG. 8.
Figure 10:
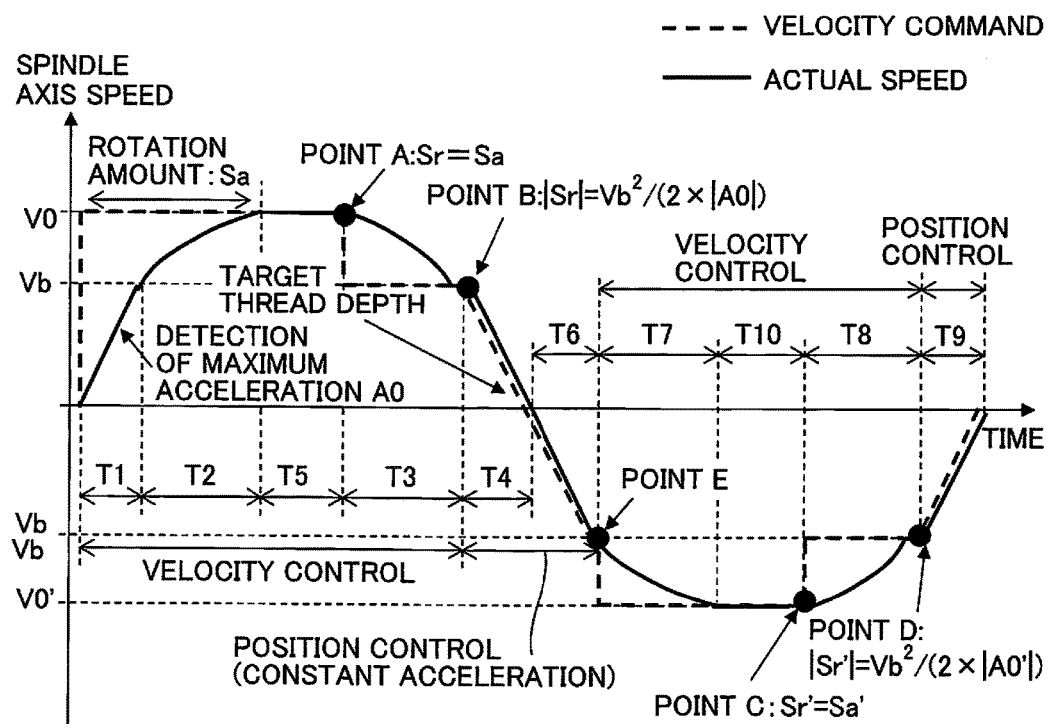
FIG. 10 is a diagram showing another example of the motion of the spindle axis in the embodiment of FIG. 8.

The controller 10 according to the embodiment shown in FIG. 1 is capable of executing a machine tool control method different from the aforementioned machine tool control method. FIG. 8 shows a cutting and return motion control method adapted to be performed for the spindle axis 12 in a tapping process, as the other embodiment of a machine tool control method executable by the controller 10. FIGS. 9 and 10 correspond respectively to FIGS. 3 and 4, and show two examples of the cutting and return motion of the spindle axis 12 in the embodiment shown in FIG. 8. With reference to FIGS. 1, 2, 5A to 10, the machine tool control method (the cutting and return motion control method in the tapping process) of another embodiment, as well as the configuration of the controller 10 executing this method, will be described below.

In summary, in the embodiment shown in FIGS. 8 to 10, the controller 10 executes several steps analogous to the steps in the cutting motion control method of the tapping process shown in FIG. 2, and thereby controls the cutting motion of the spindle axis 12, during a period when the spindle axis 12 is moved from the process start position (rotational position) to the target thread depth (rotational position). On the other hand, the spindle-axis control section 18 (the positioning-motion control section 38) of the controller 10 is configured not to make the spindle axis 12 stop at the target thread depth (i.e., not to set the acceleration to zero) at an instant when the spindle axis 12 reaches the target thread depth, but to make the spindle axis 12 perform an accelerated inverse rotation at maximum capacity until a predetermined rotational position (hereinafter referred to as an initial return position) at the maximum acceleration A0' (negative value) of inverse rotation, which is equal to the maximum deceleration A0 (negative value) in the decelerated rotation at maximum capacity. After making the spindle axis 12 perform the accelerated inverse rotation until the initial return position, the controller 10 executes several steps analogous to the steps in the return motion control method of the tapping process shown in FIG. 6, and thereby controls the return motion of the spindle axis 12. Further, the controller 10 executes several steps analogous to the steps in the exemplary overshoot-monitoring flow shown in FIGS. 5A and 5B so as to monitor the overshoot of the spindle axis 12 relative to the target thread depth at a time when the spindle axis 12 reaches the target thread depth, and also executes several steps analogous to the steps in the exemplary overshoot-monitoring flow shown in FIGS. 7A and 7B so as to monitor the overshoot of the spindle axis 12 relative to the return completion position at a time when the spindle axis 12 reaches the return completion position. The configuration of this embodiment will be described in detail below. However, the description of components corresponding to those in the flowcharts of FIGS. 2, 5A, 5B, 6, 7A and 7B will be omitted as appropriate.

As shown in FIG. 8, the controller 10 first executes, at step U1, the processes of steps S1 to S6, S8 and S9 shown in FIG. 2. More specifically, the numerical control section 16 (the spindle-axis command outputting section 26) instructs the total rotation amount S0 and the maximum rotation speed V0, of the spindle axis 12, to the spindle-axis control section 18 (step S1). The spindle-axis control section 18 (the initial-motion control section 30, the maximum-acceleration detecting section 32 and the residual rotation-amount detecting section 34) makes the spindle axis 12 perform the accelerated rotation at maximum capacity to perform the cutting motion from the process start position, with the maximum rotation speed V0 set as a target speed, and detects the maximum acceleration A0 and the residual rotation amount Sr during the accelerated rotation (step S2). Thereafter, the spindle-axis control section 18 (the current-speed detecting section 36) sequentially detects the current speed Vc during the accelerated rotation at maximum capacity, and judges whether the current speed Vc has not reached the maximum rotation speed V0 (step S3). If Vc has not yet reached V0, the spindle-axis control section 18 judges whether the residual rotation amount Sr is equal to or less than one-half of the total rotation amount S0 (step S4). If Sr is equal to or less than one-half of S0, the spindle-axis control section 18 makes the spindle axis 12 perform the decelerated rotation until the speed Vb so as to continuously perform the cutting motion (step S5). On the other hand, if it is judged that the current speed Vc has reached the maximum rotation speed V0 (step S3), the spindle-axis control section 18 stores a rotation amount (i.e., a rotational position FBS) of the spindle axis 12 from the process start position at an instant when the spindle axis reaches the maximum rotation speed V0, as the acceleration rotation amount Sa (step S8), and judges whether the residual rotation amount Sr is equal to or less than the acceleration rotation amount Sa (step S9). If Sr is equal to or less than Sa, the spindle-axis control section 18 makes the spindle axis 12 perform the decelerated rotation until the speed Vb so as to continuously perform the cutting motion (step S5). Thereafter, the spindle-axis control section 18 (the positioning-motion control section 38) judges whether the residual rotation amount Sr of the spindle axis 12 at the current position satisfies the equation 1:

$$|Sr|=Vb^2/(2\times|A0|) \quad \text{(step S6)}.$$

Referring now to FIG. 9, one example of the cutting motion of the spindle axis 12, in the case where the residual rotation amount Sr reaches one-half of the total rotation amount S0 before the current speed Vc reaches the maximum rotation speed V0 during the cutting motion at step U1 of FIG. 8 (i.e., in the case where the judgment results at respective steps S3 and S4 of FIG. 2 are YES), is depicted by a speed-time curve (the curve above a time axis). The motions of the spindle axis 12 in time periods T1, T2, T3 and T4 in the speed-time curve of FIG. 9 correspond to the motions of the spindle axis 12 in time periods T1, T2, T3 and T4 in the aforementioned speed-time curve of FIG. 3. More specifically, as shown in FIG. 9, the accelerated rotation of the spindle axis 12 at maximum capacity (by a velocity control) is performed during the time periods T1 and T2; then at the time point A when the residual rotation amount Sr reaches one-half of the total rotation amount S0 (i.e., when the judgment result at step S4 becomes YES), the motion of the spindle axis 12 changes from the accelerated rotation to the decelerated rotation; thereafter, the decelerated rotation of the spindle axis 12 at maximum capacity (by a velocity control) is performed in the time period T3; and thereafter, the decelerated rotation of the spindle axis 12 at maximum deceleration A0 (by a position control) is performed in the time period T4.

With the controller 10 executes step U1 (especially, steps S1 to S2 to S3 to S4 to S5 to S6 of FIG. 2 in this order), the spindle axis 12 operates, in the time periods T1, T2 and T3 shown in FIG. 9, in the same way as the operation in the time periods T1, T2 and T3 shown in FIG. 3. If the spindle-axis control section 18 (the positioning-motion control section 38) judges that the residual rotation amount Sr of the spindle axis 12 satisfies the aforementioned equation 1 at step U1 (step S6 of FIG. 2), the spindle-axis control section 18 (the positioning-motion control section 38) prepares, at step U2 of FIG. 8 instead of step S7 of FIG. 2, a command for making the spindle axis 12 perform the decelerated rotation at the maximum deceleration A0 so as to reach the point of Sr=0 (i.e., the target thread depth) and subsequently perform the accelerated inverse rotation until the initial return position (i.e., time point E shown in FIG. 9) at the maximum acceleration A0' of inverse rotation, identical to the maximum deceleration A0 (i.e., A0=A0'), and executes a position control for the spindle axis 12 with use of the prepared command.

As shown in FIG. 9, the spindle axis 12 performs, in accordance with the command from the spindle-axis control section 18 (the positioning-motion control section 38), the cutting motion from the point B toward the target thread depth while performing the decelerated rotation at the maximum deceleration A0, and reaches the target thread depth when Sr becomes equal to zero (in the time period T4). At the moment the spindle axis 12 reaches the target thread depth, the current speed Vc of the spindle axis 12 becomes equal to zero, but the spindle axis 12 further operates, in accordance with the command from the spindle-axis control section 18 (the positioning-motion control section 38), to maintain the maximum deceleration A0 and generate the maximum acceleration A0' of inverse rotation, and performs a return motion from the target thread depth toward the point E over the time period T6 by the accelerated inverse rotation for gradually increasing the current speed Vc (negative value). In this way, in the time period T4 in which the spindle axis operates from the point B to reach the target thread depth and in the time period T6 in which the spindle axis operates from the target thread depth to reach the point E, the spindle-axis control section 18 executes a position control for the spindle axis 12 (step U2) and continuously moves the spindle axis 12 at a constant acceleration (i.e., the maximum deceleration A0 and the maximum acceleration A0' of inverse rotation) (a velocity command at the constant acceleration, obtained from a position command, is shown by a broken line). Note that, although the current speed Vc of the spindle axis 12 becomes zero at the target thread depth, this is a momentary phenomenon, and thus should not be considered as to stop at the target thread depth.

The initial return position (point E) of the spindle axis 12 can be set arbitrarily. For example, as shown in FIG. 9, the point E may be set at a position at which the current speed Vc' of inverse rotation of the spindle axis 12 reaches the predetermined speed Vb, in the same way as the point B at which the decelerated rotation at the maximum deceleration A0 (by the position control) starts during the cutting motion. In this configuration, the position of the point E is considered as a position where the spindle axis reaches by performing the inverse rotation from the target thread depth by a rotation amount corresponding to $|Sr|=Vb^2/(2\times|A0|)$. The return motion of the spindle axis 12 by the position control in the time period T6 is analogous to the return motion of the spindle axis 12 by the velocity control in the time period T6 shown in FIG. 3. However, because of control characteristics, the maximum deceleration A0 (in the time period T4) during the decelerated rotation at maximum capacity by the position control tends to be slightly suppressed in comparison to the maximum acceleration A0 (in the time period T1) during the accelerated rotation at maximum capacity by the velocity control, and as a result, the maximum acceleration A0' of inverse rotation in the time period T6 also tends to be slightly lowered in comparison to the maximum acceleration A0 in the time period T1.

On the other hand, referring to FIG. 10, one example of the cutting motion of the spindle axis 12, in the case where the current speed Vc reaches the maximum rotation speed V0 before the residual rotation amount Sr reaches one-half of the total rotation amount S0 during the cutting motion at step U1 of FIG. 8 (i.e., in the case where the judgment result at step S3 of FIG. 2 is NO), is depicted by a speed-time curve (the curve above a time axis). The motions of the spindle axis 12 in time periods T1, T2, T5, T3 and T4 in the speed-time curve of FIG. 10 correspond to the motions of the spindle axis 12 in time periods T1, T2, T5, T3 and T4 in the aforementioned speed-time curve of FIG. 4. More specifically, as shown in FIG. 10, the accelerated rotation of the spindle axis 12 at maximum capacity (by a velocity control) is performed during the time periods T1 and T2, so that the current speed Vc of the spindle axis 12 reaches the maximum rotation speed V0; thereafter, the spindle axis 12 rotates at the constant speed V0 over the time period T5 so as to continue the cutting motion; then at the time point A when the residual rotation amount Sr becomes equal to the acceleration rotation amount Sa (i.e., when the judgment result at step S9 becomes YES), the motion of the spindle axis 12 changes from the accelerated rotation to the decelerated rotation; thereafter, the decelerated rotation of the spindle axis 12 at maximum capacity (by a velocity control) is performed in the time period T3; and thereafter, the decelerated rotation of the spindle axis 12 at maximum deceleration A0 (by a position control) is performed in the time period T4.

With the controller 10 executes step U1 (especially, steps S1 to S2 to S3 to S8 to S9 to S5 to S6 in FIG. 2 in this order), the spindle axis 12 operates, in the time periods T1, T2, T5 and T3 shown in FIG. 10, in the same way as the operation in the time periods T1, T2, T5 and T3 shown in FIG. 4. If the spindle-axis control section 18 (the positioning-motion control section 38) judges that the residual rotation amount Sr of the spindle axis 12 satisfies the aforementioned equation 1 at step U1 (step S6 of FIG. 2), the spindle-axis control section 18 (the positioning-motion control section 38) prepares, at step U2 of FIG. 8 instead of step S7 of FIG. 2, a command for making the spindle axis 12 perform the decelerated rotation at the maximum deceleration A0 so as to reach the point of Sr=0 (i.e., the target thread depth) and subsequently perform the accelerated inverse rotation until the initial return position (i.e., time point E shown in FIG. 10) at the maximum acceleration A0' of inverse rotation, identical to the maximum deceleration A0 (i.e., A0=A0'), and executes a position control for the spindle axis 12 with use of the prepared command.

As shown in FIG. 10, the spindle axis 12 performs, in accordance with the command from the spindle-axis control section 18 (the positioning-motion control section 38), the cutting motion from the point B toward the target thread depth while performing the decelerated rotation at the maximum deceleration A0, and reaches the target thread depth when Sr becomes equal to zero (in the time period T4). At the moment the spindle axis 12 reaches the target thread depth, the current speed Vc of the spindle axis 12 becomes equal to zero, but the spindle axis 12 further operates, in accordance with the command from the spindle-axis control section 18 (the positioning-motion control section 38), to maintain the maximum deceleration A0 and generate the maximum acceleration A0' of inverse rotation, and performs a return motion from the target thread depth toward the point E over the time period T6 by the accelerated inverse rotation for gradually increasing the current speed Vc (negative value). In this way, in the time period T4 in which the spindle axis operates from the point B to reach the target thread depth and in the time period T6 in which the spindle axis operates from the target thread depth to reach the point E, the spindle-axis control section 18 executes a position control for the spindle axis 12 (step U2) and continuously moves the spindle axis 12 at a constant acceleration (i.e., the maximum deceleration A0 and the maximum acceleration A0' of inverse rotation) (a velocity command at the constant acceleration, obtained from a position command, is shown by a broken line). Thus, the motion of the spindle axis 12 in the time periods T4 and T6 shown in FIG. 10 corresponds to the motion of the spindle axis 12 in the time periods T4 and T6 shown in FIG. 9.

In the motion examples shown in FIGS. 9 and 10, during a period when the spindle-axis control section 18 controls the rotational motion of the spindle axis 12 from the process start position to the target thread depth, the feed-axis control section 22 controls the feed axis 14 so as to perform a feed motion while following the motion of the spindle axis 12, with use of the rotational position FBS of the spindle axis 12. During a period when the spindle-axis control section 18 executes the aforementioned processes of step U1 and step U2, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

When the position control is executed to make the spindle axis 12 reach the target thread depth as described above, the controller 10 executes, at step U3 (FIG. 8), steps S10 to S12 shown in FIG. 5A, or alternatively, steps S10 to S12' shown in FIG. 5B. More specifically, the spindle-axis control section 18 (the overshoot detecting section 40) detects the overshoot Ov of the spindle axis 12 relative to the target thread depth at a time when the spindle axis 12 reaches the target thread depth (i.e., Vc becomes equal to zero), as an actual measurement value of the residual rotation amount Sr, based on the sequentially detected residual rotation amount Sr and current speed Vc (step S10). Next, the spindle-axis control section 18 (the positioning-motion control section 38) continuously monitors the overshoot Ov and judges whether or not the overshoot Ov exceeds a predetermined permissible value Op (step S11). If it is judged that the overshoot Ov exceeds the predetermined permissible value Op, the spindle-axis control section 18 (the positioning-motion control section 38) sets, at the moment of the judgment, a position command for the spindle axis 12 at zero and thereby immediately stops the spindle axis 12, so as to force-quit the cutting motion control flow (step S12), or alternatively, the spindle-axis control section 18 (the positioning-motion control section 38) provides, at the moment of the judgment, the spindle axis 12 with a command for making the spindle axis 12 perform a reverse motion until the target thread depth or until a position at the moment of the judgment that the overshoot Ov exceeds the permissible value Op, and thereby stops the spindle axis 12 when the reverse motion according to the command is completed, so as to force-quit the cutting motion control flow (step S12'). If it is judged that the overshoot Ov does not exceed the predetermined permissible value Op, a position command for the spindle axis 12 is maintained so as to make the spindle axis 12 perform a return motion until the initial return position (point E) by a position control, without force-quitting the cutting motion control flow.

While the controller 10 executes step U3, during a period from the moment when the spindle-axis control section 18 (the positioning-motion control section 38) judges that the overshoot Ov exceeds the permissible value Op until the instant when the positioning-motion control section 38 stops the spindle axis 12, the feed-axis control section 22 (FIG. 1) controls the feed motion of the feed axis 14 so as to follow the motion of the spindle axis 12, with use of the rotational position FBS of the spindle axis 12, and thereby stops the feed axis 14 synchronously with the spindle axis 12.

After the spindle-axis control section 18 has force-quitted the cutting motion control flow, the numerical control section 16, for example, may be configured to output an alarm signal based on the force-quitting signal notified from the spindle-axis control section 18 and thereby inform an operator of the force-quit of the cutting motion (i.e., the abnormality in the overshoot Ov of the spindle axis 12). Note that the aforementioned overshoot-monitoring flow at step U3 may be applied to any of the motion examples of FIGS. 9 and 10.

In the case where the cutting motion control flow is not force-quitted at step U3 and thereby the position control for the spindle axis 12 until the initial return position (point E) at step S2 is continuously executed (i.e., in the case where the judgment result at step S11 is NO), the numerical control section 16 (the spindle-axis command outputting section 26) obtains, after it is judged that the tapping process has reached the target thread depth, the total return-rotation amount S0' and the maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as the spindle axis command CS to the spindle-axis control section 18, at step U4 (FIG. 8) and concurrently with step U2.

After the spindle axis 12 has reached the initial return position (point E), the spindle-axis control section 18 (the initial-motion control section 30) makes, at step U5 (FIG. 8), the spindle axis 12 perform an accelerated inverse rotation at maximum capacity using the maximum permissible current of the drive source, from the initial return position (point E) toward the return completion position, with the maximum return-rotation speed V0' set as a target speed, so as to perform the return motion. The spindle-axis control section 18 (the residual rotation-amount detecting section 34) sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected. In this embodiment, the maximum-acceleration detecting section 32 does not detect a maximum acceleration of inverse rotation of the spindle axis 12 during the time period T6, but obtains the maximum deceleration A0 in the decelerated rotation at maximum capacity during the time period T4 (which corresponds to the maximum acceleration A0 during the time period T1) as the maximum acceleration A0' of inverse rotation of the spindle axis 12 performing the accelerated inverse rotation from the target thread depth.

Next, the controller 10 executes, at step U6 (FIG. 8), the processes of steps S15 to S21 shown in FIG. 6. More specifically, the spindle-axis control section 18 (the current-speed detecting section 36) sequentially detects the current speed Vc' of inverse rotation based on the rotational position FBS during the accelerated inverse rotation at maximum capacity, and judges whether the current speed Vc' has not reached the maximum return-rotation speed V0' (step S15). If Vc' has not reached V0', the spindle-axis control section 18 judges whether the residual return-rotation amount Sr' is equal to or less than one-half of the total return-rotation amount S0' (step S16). If Sr' is equal to or less than one-half of S0', the spindle-axis control section 18 makes the spindle axis 12 perform the decelerated inverse rotation until the speed Vb so as to continuously perform the return motion (step S17). On the other hand, if it is judged that the current speed Vc' has reached the maximum return-rotation speed V0' (step 15), the spindle-axis control section 18 stores a rotation amount of the spindle axis 12 from the target thread depth (i.e., a rotational position FBS) at an instant when the spindle axis reaches the maximum return-rotation speed V0', as the acceleration rotation amount Sa' of the return motion (step S20), and judges whether the residual return-rotation amount Sr' is equal to or less than the acceleration rotation amount Sa' (step S21). If Sr' is equal to or less than Sa', the spindle-axis control section 18 makes the spindle axis 12 perform the decelerated inverse rotation until the speed Vb so as to continuously perform the return motion (step S17). Thereafter, the spindle-axis control section 18 (the positioning-motion control section 38) judges whether the residual return-rotation amount Sr' of the spindle axis 12 at the current position satisfies the equation 2:

$$|Sr'|=Vb^2/(2\times|A0'|) \qquad \text{(step S18).}$$

If the equation 2 is satisfied, the spindle-axis control section 18 (the positioning-motion control section 38) prepares a command for making the spindle axis 12 perform the decelerated inverse rotation at the maximum deceleration A0' (corresponding to the maximum acceleration A0' of inverse rotation in the time period T6) and stop at the point of Sr'=0 (i.e., the return completion position), and executes a position control for the spindle axis 12 with use of the prepared command (step S19). The spindle axis 12 performs the return motion toward the return completion position, in accordance with the command from the spindle-axis control section 18 (the positioning-motion control section 38), by performing the decelerated inverse rotation at maximum deceleration A0', and stops at an instant when Sr' becomes equal to zero.

Referring now to FIG. 9, one example of the return motion of the spindle axis 12, in the case where the residual return-rotation amount Sr' reaches one-half of the total return-rotation amount S0' before the current speed Vc' of inverse rotation reaches the maximum return-rotation speed V0' at step U6 of FIG. 8 (i.e., in the case where the judgment results at respective steps S15 and S16 of FIG. 6 are YES), is depicted by a speed-time curve (the curve below a time axis). The motions of the spindle axis 12 in time periods T7, T8 and T9 in the speed-time curve of FIG. 9 correspond to the motions of the spindle axis 12 in time periods T7, T8 and T9 in the aforementioned speed-time curve of FIG. 3. In the motion example of FIG. 9, after the spindle axis 12 moves from the target thread depth to reach the initial return position (point E) during the time period T6, the current speed Vc' of inverse rotation of the spindle axis 12 exceeds Vb (negative value), so that the acceleration of inverse rotation of the spindle axis 12 in the accelerated inverse rotation at maximum capacity gradually decreases from the maximum acceleration A0' due to the characteristics of the spindle motor (in the time period T7). At a time point C when the residual return-rotation amount Sr' reaches one-half of the total return-rotation amount S0' (i.e., when the judgment result at step S16 of FIG. 6 becomes YES), the motion of the spindle axis 12 changes from the accelerated inverse rotation to the decelerated inverse rotation; thereafter, the decelerated inverse rotation of the spindle axis 12 at maximum capacity (by a velocity control) is performed in the time period T8; and thereafter, the decelerated inverse rotation of the spindle axis 12 at maximum deceleration A0' (by a position control) is performed in the time period T9.

On the other hand, referring to FIG. 10, one example of the return motion of the spindle axis 12, in the case where the current speed Vc' of inverse rotation reaches the maximum return-rotation speed V0' before the residual return-rotation amount Sr' reaches one-half of the total return-rotation amount S0' at step U6 of FIG. 8 (i.e., in the case where the judgment result at step S15 of FIG. 6 is NO), is depicted by a speed-time curve (the curve below a time axis). The motions of the spindle axis 12 in time periods T7, T10, T8 and T9 in the speed-time curve of FIG. 10 correspond to the motions of the spindle axis 12 in time periods T7, T10, T8 and T9 in the aforementioned speed-time curve of FIG. 4. In the motion example of FIG. 10, during the time period T7 after the spindle axis 12 reaches the initial return position (point E), the accelerated inverse rotation of the spindle axis 12 at maximum capacity by the gradually decreasing acceleration A0' is performed in a way similar to the motion example of FIG. 9, so that the current speed Vc' of the spindle axis 12 reaches the maximum return-rotation speed V0'. Thereafter, the spindle axis 12 inversely rotates at the constant speed V0' over the time period T10 so as to continue the return motion. At a time point C when the residual return-rotation amount Sr' becomes equal to the acceleration rotation amount Sa' (i.e., when the judgment result at step S21 of FIG. 6 becomes YES), the motion of the spindle axis 12 changes from the accelerated inverse rotation to the decelerated inverse rotation; thereafter, the decelerated inverse rotation of the spindle axis 12 at maximum capacity (by a velocity control) is performed in the time period T8; and thereafter, the decelerated inverse rotation of the spindle axis 12 at maximum deceleration A0' (by a position control) is performed in the time period T9.

In the motion examples shown in FIGS. 9 and 10, during a period when the spindle-axis control section 18 controls the inverse rotational motion of the spindle axis 12 from the target thread depth to the return completion position, the feed-axis control section 22 controls the feed axis 14 so as to perform an inverse feed motion while following the motion of the spindle axis 12, with use of the rotational position FBS of the spindle axis 12. During a period when the spindle-axis control section 18 executes the aforementioned processes from step U4 to step U6, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

When the position control is executed to make the spindle axis 12 reach the return completion position as described above, the controller 10 executes, at step U7 (FIG. 8), steps S22 to S24 shown in FIG. 7A, or alternatively, steps S22 to S24' shown in FIG. 7B. More specifically, the spindle-axis control section 18 (the overshoot detecting section 40) detects the overshoot Ov of the spindle axis 12 relative to the return completion position at a time when the spindle axis 12 reaches the return completion position (i.e., Vc' becomes equal to zero), as an actual measurement value of the residual return-rotation amount Sr', based on the sequentially detected residual return-rotation amount Sr' and current speed Vc' (step S22). Next, the spindle-axis control section 18 (the positioning-motion control section 38) continuously monitors the overshoot Ov and judges whether or not the overshoot Ov exceeds a predetermined permissible value Op (step S23). If it is judged that the overshoot Ov exceeds the predetermined permissible value Op, the spindle-axis control section 18 (the positioning-motion control section 38) sets, at the moment of the judgment, a position command for the spindle axis 12 at zero and thereby immediately stops the spindle axis 12, so as to force-quit the return motion control flow (step S24), or alternatively, the spindle-axis control section 18 (the positioning-motion control section 38) provides, at the moment of the judgment, the spindle axis 12 with a command for making the spindle axis 12 perform a reverse motion until the target thread depth or until a position at the moment of the judgment that the overshoot Ov exceeds the permissible value Op, and thereby stops the spindle axis 12 when the reverse motion according to the command is completed, so as to force-quit the return motion control flow (step S24'). If it is judged that the overshoot Ov does not exceed the predetermined permissible value Op, a position command for the spindle axis 12 is maintained and the return motion control flow is finished with the stoppage of the spindle axis 12, without force-quitting the return motion control flow.

While the controller 10 executes step U7, during a period from the moment when the spindle-axis control section 18 (the positioning-motion control section 38) judges that the overshoot Ov exceeds the permissible value Op until the instant when the positioning-motion control section 38 stops the spindle axis 12, the feed-axis control section 22 (FIG. 1) controls the inverse feed motion of the feed axis 14 so as to follow the motion of the spindle axis 12, with use of the rotational position FBS of the spindle axis 12, and thereby stops the feed axis 14 synchronously with the spindle axis 12.

After the spindle-axis control section 18 has force-quitted the return motion control flow, the numerical control section 16, for example, may be configured to output an alarm signal based on the force-quitting signal notified from the spindle-axis control section 18 and thereby inform an operator of the force-quit of the return motion (i.e., the abnormality in the overshoot Ov of the spindle axis 12). Note that the aforementioned overshoot-monitoring flow at step U7 may be applied to any of the motion examples of FIGS. 9 and 10.

The controller 10 according to the embodiment depicted in FIGS. 8 to 10 has a configuration wherein, when the spindle axis 12 is made to perform the cutting motion from the process start position to the target thread depth, the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the maximum acceleration A0 during the accelerating step and the sequentially detected residual rotation amount Sr and current speed Vc of the spindle axis 12, the cutting motion until the target thread depth in the shortest time while decelerating the spindle axis 12 at the maximum deceleration A0 so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12, analogously to the controller 10 according to the embodiment of FIGS. 1-7B.

Further, the controller 10 has a configuration wherein, when the spindle axis 12 reaches the target thread depth, the spindle-axis control section 18 (the overshoot detecting section 40) detects the overshoot Ov of the spindle axis 12 relative to the target thread depth based on the sequentially detected residual rotation amount Sr. Therefore, according to the controller 10, it is possible to quickly judge whether the overshoot Ov of the spindle axis 12 relative to the target thread depth is abnormal or not, and to promptly perform urgent countermeasures, such as a forced outage of the spindle axis 12, when the abnormal overshoot occurs, so that it is possible to ensure a dimensional accuracy required for the tapping process, analogously to the controller 10 according to the embodiment of FIGS. 1-7B.

Moreover, the controller 10 according to the embodiment shown in FIGS. 8 to 10 has a configuration wherein, when the spindle axis 12 is made perform the return motion from the target thread depth to the return completion position, the spindle axis 12 is not made stop at the target thread depth (i.e., the acceleration is not set to zero) at the completion of the cutting motion, but is made perform the accelerated inverse rotation until the predetermined initial return position by the position control, at the maximum acceleration A0' (negative value) of inverse rotation, which is equal to the maximum deceleration A0 (negative value). According to this configuration, the acceleration of the spindle axis 12 is not changed at an instant when the operation of the spindle axis 12 is changed from the cutting motion to the return motion, so that it is possible to avoid a mechanical or structural shock that may be caused on the spindle axis 12 due to the change in the acceleration as well as an increase of synchronization error that may be caused between the spindle axis 12 and the feed axis 14 due to the change in the acceleration.

In the controller 10 according to the embodiment depicted in FIGS. 8 to 10 has a configuration wherein, after the spindle axis 12 is made to perform the accelerated inverse rotation until the initial return position by the position control, the return motion is performed by accelerating the spindle axis 12 with the maximum power in accordance with the spindle axis command CS including only the total return-rotation amount S0' and maximum return-rotation speed V0' of the spindle axis 12, notified by the numerical control section 16 to the spindle-axis control section 18, and the return motion until the return completion position is continuously performed in the shortest time while decelerating the spindle axis 12 at the maximum deceleration A0' corresponding to the maximum acceleration A0' of inverse rotation just after the inversion of the motion so as to make the spindle axis stop at the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, when the spindle axis 12 reaches the return completion position, the spindle-axis control section 18 (the overshoot detecting section 40) detects the overshoot Ov of the spindle axis 12 relative to the return completion position based on the sequentially detected residual return-rotation amount Sr'. Therefore, according to the controller 10, it is possible to quickly judge whether the overshoot Ov of the spindle axis 12 relative to the return completion position is abnormal or not, and to promptly perform urgent countermeasures, such as a forced outage of the spindle axis 12, when the abnormal overshoot occurs, so that it is possible, e.g., to prevent an interference from being unexpectedly caused between a mechanical component performing an inverse feed motion by the feed axis 14 and a nearby object, analogously to the controller 10 according to the embodiment of FIGS. 1-7B.

The configuration of the controller 10 can be described as a machine tool control method for controlling a synchronized operation of the spindle axis 12 and the feed axis 14. One control method includes the steps, executed by the controller 10, of:

obtaining, from a tapping program P, a total rotation amount S0 and a maximum rotation speed V0 of the spindle axis 12 during a period when the spindle axis operates from a process start position to a target thread depth;

making the spindle axis 12 perform an accelerated rotation at maximum capacity from the process start position, by a velocity control in which the maximum rotation speed V0 is set as a target value;

detecting a maximum acceleration A0 of the spindle axis 12 during the accelerated rotation at maximum capacity, based on a rotational position feedback FBS of the spindle axis 12;

detecting a residual rotation amount Sr of the spindle axis 12 during a period when the spindle axis operates from a current position to the target thread depth, based on the total rotation amount S0 and the rotational position feedback FBS;

detecting a current speed Vc of the spindle axis 12 based on the rotational position feedback FBS;

executing a position control for making the spindle axis 12 perform a decelerated rotation so as to reach the target thread depth, after the accelerated rotation at maximum capacity, based on the maximum acceleration A0, the residual rotation amount Sr and the current speed Vc; and detecting an overshoot Ov of the spindle axis 12 relative to the target thread depth during the decelerated rotation, based on the residual rotation amount Sr.

The above method may be configured to make the spindle axis 12 stop at the target thread depth, or alternatively, may be configured not to make the spindle axis 12 stop at the target thread depth.

The other control method includes the steps, executed by the controller 10, of:

obtaining, from a tapping program P, a total return-rotation amount S0' and a maximum return-rotation speed V0' of the spindle axis 12 during a period when the spindle axis operates from a target thread depth to a return completion position;

making the spindle axis 12 perform an accelerated inverse rotation at maximum capacity from the target thread depth or from an initial return position at which the spindle axis has returned by a predetermined rotation number from the target thread depth, by a velocity control in which the maximum return-rotation speed V0' is set as a target value;

detecting or obtaining a maximum acceleration A0' of inverse rotation of the spindle axis 12 during a period when the spindle axis 12 performs the accelerated inverse rotation from the target thread depth;

detecting a residual return-rotation amount Sr' of the spindle axis 12 during a period when the spindle axis operates from a current position to the return completion position, based on the total return-rotation amount S0' and a rotational position feedback FBS of the spindle axis 12;

detecting a current speed Vc' of inverse rotation of the spindle axis 12 based on the rotational position feedback FBS;

executing a position control for making the spindle axis 12 perform a decelerated inverse rotation and stop at the return completion position, after the accelerated inverse rotation at maximum capacity, based on the maximum acceleration A0' of inverse rotation, the residual return-rotation amount Sr' and the current speed Vc' of inverse rotation; and detecting an overshoot Ov of the spindle axis 12 relative to the return completion position during the decelerated inverse rotation, based on the residual return-rotation amount Sr'.

Each of the above control methods may further includes the step, executed by a controller 10, of monitoring the overshoot Ov and, at an instant when the overshoot Ov exceeds a predetermined permissible value Op, stopping the spindle axis 12.

According to the above control methods, effects corresponding to those achieved by the above-described controller 10 can be obtained.

While the invention has been described with reference to specific embodiments, it will be understood, by those skilled in the art, that various changes or modifications may be made thereto without departing from the scope of the following claims.

The invention claimed is:

1. A controller of a machine tool, configured to control a synchronized operation of a spindle axis and a feed axis, the controller comprising:
    a numerical control section configured to prepare a spindle-axis command and a feed-axis command based on a tapping program;
    a spindle-axis control section configured to control a rotational motion of the spindle axis in accordance with the spindle-axis command;
    a rotation detecting section configured to detect a rotational position of the spindle axis; and
    a feed-axis control section configured to control a feed motion of the feed axis in accordance with the feed-axis command, based on the rotational position;
    the numerical control section comprising:
        a spindle-axis command outputting section configured to obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section;
    the spindle-axis control section comprising:
        an initial-motion control section configured to make the spindle axis perform an accelerated rotation at maximum capacity using a maximum permissible current of a drive source from the process start position, by a velocity control in which the maximum rotation speed is set as a target value;
        a maximum-acceleration detecting section configured to detect a maximum acceleration of the spindle axis during the accelerated rotation at maximum capacity, based on the rotational position;
        a residual rotation-amount detecting section configured to detect a residual rotation amount of the spindle axis during a period when the spindle axis operates from a current position to the target thread depth, based on the total rotation amount and the rotational position;
        a current-speed detecting section configured to detect a current speed of the spindle axis based on the rotational position;
        a positioning-motion control section configured to execute a position control for making the spindle axis perform a decelerated rotation so as to reach the target thread depth, after the accelerated rotation at maximum capacity, based on the maximum acceleration, the residual rotation amount and the current speed; and
        an overshoot detecting section configured to detect an overshoot of the spindle axis relative to the target thread depth during the decelerated rotation, based on the residual rotation amount.

2. The controller of claim 1, wherein the spindle-axis command outputting section is configured to obtain, from the tapping program, a total return-rotation amount and a maximum return-rotation speed of the spindle axis during a period when the spindle axis operates from the target thread depth to a return completion position, and to send the total return-rotation amount and the maximum return-rotation speed as the spindle-axis command to the spindle-axis control section;
    wherein the initial-motion control section is configured to make the spindle axis perform an accelerated inverse rotation at maximum capacity using a maximum permissible current of a drive source from the target thread depth or from an initial return position at which the spindle axis has returned by a predetermined rotation number from the target thread depth, by a velocity control in which the maximum return-rotation speed is set as a target value;

wherein the maximum-acceleration detecting section is configured to detect or obtain a maximum acceleration of inverse rotation of the spindle axis during a period when the spindle axis performs the accelerated inverse rotation from the target thread depth;

wherein the residual rotation-amount detecting section is configured to detect a residual return-rotation amount of the spindle axis during a period when the spindle axis operates from a current position to the return completion position, based on the total return-rotation amount and the rotational position;

wherein the current-speed detecting section is configured to detect a current speed of inverse rotation of the spindle axis based on the rotational position;

wherein the positioning-motion control section is configured to execute a position control for making the spindle axis perform a decelerated inverse rotation and stop at the return completion position, after the accelerated inverse rotation at maximum capacity, based on the maximum acceleration of inverse rotation, the residual return-rotation amount and the current speed of inverse rotation; and wherein the overshoot detecting section is configured to detect an overshoot of the spindle axis relative to the return completion position during the decelerated inverse rotation, based on the residual return-rotation amount.

3. The controller of claim 1, wherein the positioning-motion control section is configured to monitor the overshoot detected by the overshoot detecting section, and at a moment when it is judged that the overshoot exceeds a predetermined permissible value, to set a position command for the spindle axis at zero and thereby stop the spindle axis.

4. The controller of claim 1, wherein the positioning-motion control section is configured to monitor the overshoot detected by the overshoot detecting section, and at a moment when it is judged that the overshoot relative to the target thread depth exceeds a predetermined permissible value, to provide the spindle axis with a command for making the spindle axis perform a reverse motion until the target thread depth or a position at the moment of judgment that the overshoot exceeds the permissible value, and thereby stop the spindle axis when the reverse motion is completed.

5. The controller of claim 2, wherein the positioning-motion control section is configured to monitor the overshoot detected by the overshoot detecting section, and at a moment when it is judged that the overshoot relative to the return completion position exceeds a predetermined permissible value, to provide the spindle axis with a command for making the spindle axis perform a reverse motion until the return completion position or a position at the moment of judgment that the overshoot exceeds the permissible value, and thereby stop the spindle axis when the reverse motion is completed.

6. The controller of claim 3, wherein the feed-axis control section is configured to control the feed motion of the feed axis with use of the rotational position of the spindle axis, during a period from the moment when the positioning-motion control section judges that the overshoot exceeds the permissible value until the instant when the positioning-motion control section stops the spindle axis.

7. A controller of a machine tool, configured to control a synchronized operation of a spindle axis and a feed axis, the controller comprising:

a numerical control section configured to prepare a spindle-axis command and a feed-axis command based on a tapping program;

a spindle-axis control section configured to control a rotational motion of the spindle axis in accordance with the spindle-axis command;

a rotation detecting section configured to detect a rotational position of the spindle axis; and a feed-axis control section configured to control a feed motion of the feed axis in accordance with the feed-axis command, based on the rotational position;

the numerical control section comprising:

a spindle-axis command outputting section configured to obtain, from the tapping program, a total return-rotation amount and a maximum return-rotation speed of the spindle axis during a period when the spindle axis operates from a target thread depth to a return completion position, and to send the total return-rotation amount and the maximum return-rotation speed as the spindle-axis command to the spindle-axis control section;

the spindle-axis control section comprising:

an initial-motion control section configured to make the spindle axis perform an accelerated inverse rotation at maximum capacity using a maximum permissible current of a drive source from the target thread depth or from an initial return position at which the spindle axis has returned by a predetermined rotation number from the target thread depth, by a velocity control in which the maximum return-rotation speed is set as a target value;

a maximum-acceleration detecting section configured to detect or obtain a maximum acceleration of inverse rotation of the spindle axis during a period when the spindle axis performs the accelerated inverse rotation from the target thread depth;

a residual rotation-amount detecting section configured to detect a residual return-rotation amount of the spindle axis during a period when the spindle axis operates from a current position to the return completion position, based on the total return-rotation amount and the rotational position;

a current-speed detecting section configured to detect a current speed of inverse rotation of the spindle axis based on the rotational position;

a positioning-motion control section configured to execute a position control for making the spindle axis perform a decelerated inverse rotation and stop at the return completion position, after the accelerated inverse rotation at maximum capacity, based on the maximum acceleration of inverse rotation, the residual return-rotation amount and the current speed of inverse rotation; and an overshoot detecting section configured to detect an overshoot of the spindle axis relative to the return completion position during the decelerated inverse rotation, based on the residual return-rotation amount.

8. A method of controlling a machine tool, configured to control a synchronized operation of a spindle axis and a feed axis, the method comprising the steps, executed by a controller, of:

obtaining, from a tapping program, a total rotation amount and a maximum rotation speed of the spindle axis during a period when the spindle axis operates from a process start position to a target thread depth;

making the spindle axis perform an accelerated rotation at maximum capacity using a maximum permissible current of a drive source from the process start position, by a velocity control in which the maximum rotation speed is set as a target value;

detecting a maximum acceleration of the spindle axis during the accelerated rotation at maximum capacity, based on a rotational position feedback of the spindle axis;

detecting a residual rotation amount of the spindle axis during a period when the spindle axis operates from a current position to the target thread depth, based on the total rotation amount and the rotational position feedback;

detecting a current speed of the spindle axis based on the rotational position feedback;

executing a position control for making the spindle axis perform a decelerated rotation so as to reach the target thread depth, after the accelerated rotation at maximum capacity, based on the maximum acceleration, the residual rotation amount and the current speed; and detecting an overshoot of the spindle axis relative to the target thread depth during the decelerated rotation, based on the residual rotation amount.

9. A method of controlling a machine tool, configured to control a synchronized operation of a spindle axis and a feed axis, the method comprising the steps, executed by a controller, of:

obtaining, from a tapping program, a total return-rotation amount and a maximum return-rotation speed of the spindle axis during a period when the spindle axis operates from a target thread depth to a return completion position;

making the spindle axis perform an accelerated inverse rotation at maximum capacity using a maximum permissible current of a drive source from the target thread depth or from an initial return position at which the spindle axis has returned by a predetermined rotation number from the target thread depth, by a velocity control in which the maximum return-rotation speed is set as a target value;

detecting or obtaining a maximum acceleration of inverse rotation of the spindle axis during a period when the spindle axis performs the accelerated inverse rotation from the target thread depth;

detecting a residual return-rotation amount of the spindle axis during a period when the spindle axis operates from a current position to the return completion position, based on the total return-rotation amount and a rotational position feedback of the spindle axis;

detecting a current speed of inverse rotation of the spindle axis based on the rotational position feedback;

executing a position control for making the spindle axis perform a decelerated inverse rotation and stop at the return completion position, after the accelerated inverse rotation at maximum capacity, based on the maximum acceleration of inverse rotation, the residual return-rotation amount and the current speed of inverse rotation; and detecting an overshoot of the spindle axis relative to the return completion position during the decelerated inverse rotation, based on the residual return-rotation amount.

10. The method of claim 8, further comprising the step, executed by a controller, of monitoring the overshoot and, at an instant when the overshoot exceeds a predetermined permissible value, stopping the spindle axis.

* * * * *